US009538230B2

(12) United States Patent
He et al.

(10) Patent No.: US 9,538,230 B2
(45) Date of Patent: Jan. 3, 2017

(54) METHODS AND APPARATUSES FOR PROVIDING MULTI-SERVICE VIA A SIGNAL CONVERGENCE TERMINAL

(71) Applicant: Huawei Device Co., Ltd., Shenzhen (CN)

(72) Inventors: Zhiqin He, Shenzhen (CN); Liu Fang, Shenzhen (CN); Hongjie Yao, Shenzhen (CN); Zheng Xu, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 67 days.

(21) Appl. No.: 14/585,996

(22) Filed: Dec. 30, 2014

(65) Prior Publication Data

US 2015/0113580 A1    Apr. 23, 2015

Related U.S. Application Data

(63) Continuation of application No. PCT/CN2012/079584, filed on Aug. 2, 2012.

(51) Int. Cl.
*H04N 21/422*    (2011.01)
*G06F 13/14*    (2006.01)
(Continued)

(52) U.S. Cl.
CPC ........ *H04N 21/42204* (2013.01); *G06F 13/14* (2013.01); *G06F 13/4022* (2013.01);
(Continued)

(58) Field of Classification Search
CPC .................. H04N 21/42204; H04N 21/64746; H04N 21/6175; H04N 21/64322; H04N 21/4622; G06F 13/14; G06F 13/4022; H04L 12/6418
(Continued)

(56) References Cited

U.S. PATENT DOCUMENTS

| | | | | |
|---|---|---|---|---|
| 8,839,328 | B2 * | 9/2014 | Li | ........................ H04L 65/1063 |
| | | | | 709/217 |
| 2006/0290814 | A1 | 12/2006 | Walter | |

(Continued)

FOREIGN PATENT DOCUMENTS

| CN | 101465980 | * | 6/2009 | ............. H04N 21/40 |
|---|---|---|---|---|
| CN | 101883206 A | | 11/2010 | |
| CN | 101969526 A | | 2/2011 | |

OTHER PUBLICATIONS

Netgear, Preparing Your Network, Sep. 2005, Netgear, v 1.0, 2-1 to 2-20.*

(Continued)

*Primary Examiner* — Hoang-Vu A Nguyen-Ba
(74) *Attorney, Agent, or Firm* — Conley Rose, P.C.

(57) ABSTRACT

A convergence terminal, including a set top box unit, a home gateway unit, a main control board and an interconnection backplane, where the main control board establishes a communication connection with each of a multimedia device and an Internet access device, the main control board connects, in a communication manner, to each of the set top box unit and the home gateway unit through the interconnection backplane. In the present invention, an objective of implementing that a television service and an Internet access service are separately provided through a service terminal is achieved, thereby reducing the number of service terminals used by a user for enjoying different services, and also reducing frequent wiring operations of the user on connection wires for inward connection and outward connection.

7 Claims, 15 Drawing Sheets

(51) Int. Cl.
*G06F 13/40* (2006.01)
*H04N 21/647* (2011.01)
*H04N 21/61* (2011.01)
*H04N 21/643* (2011.01)
*H04N 21/462* (2011.01)
*H04L 12/64* (2006.01)

(52) U.S. Cl.
CPC ..... *H04L 12/6418* (2013.01); *H04N 21/4622* (2013.01); *H04N 21/6175* (2013.01); *H04N 21/64322* (2013.01); *H04N 21/64746* (2013.01)

(58) Field of Classification Search
USPC ....... 725/110, 117, 130, 131, 133, 139, 141, 725/147, 150, 151, 153; 709/249, 250, 709/230, 229
See application file for complete search history.

(56) References Cited

U.S. PATENT DOCUMENTS

| | | | | |
|---|---|---|---|---|
| 2008/0034421 | A1* | 2/2008 | Ahn | G06F 21/10 726/17 |
| 2008/0120675 | A1* | 5/2008 | Morad | H04N 7/17318 725/120 |
| 2010/0115113 | A1* | 5/2010 | Short | H04L 63/08 709/228 |
| 2011/0289536 | A1* | 11/2011 | Poder | H04H 60/97 725/95 |
| 2012/0014049 | A1 | 1/2012 | Ogle et al. | |
| 2012/0017252 | A1* | 1/2012 | Li | H04L 65/1063 725/110 |
| 2013/0343761 | A1* | 12/2013 | Fang | H04Q 11/0067 398/115 |
| 2014/0082141 | A1* | 3/2014 | Li | H04N 21/6125 709/217 |
| 2014/0186039 | A1* | 7/2014 | Luo | H04L 12/2861 398/66 |
| 2015/0236965 | A1* | 8/2015 | Short | H04L 47/25 709/233 |

OTHER PUBLICATIONS

Partial English Translation and Abstract of Chinese Patent Application No. CN101883206A, Feb. 25, 2015, 2 pages.
Foreign Communication From A Counterpart Application, European Application No. 12882007.3 Extended European Search Report dated Mar. 24, 2015, 6 pages.
Foreign Communication From A Counterpart Application, PCT Application No. PCT/CN2012/079584, English Translation of International Search Report dated Nov. 22, 2012, 3 pages.
Foreign Communication From A Counterpart Application, PCT Application No. PCT/CN2012/079584, English Translation of Written Opinion dated Nov. 22, 2012, 12 pages.

* cited by examiner

METHODS AND APPARATUSES FOR PROVIDING MULTI-SERVICE VIA A SIGNAL CONVERGENCE TERMINAL

CROSS-REFERENCE TO RELATED APPLICATIONS

This application is a continuation of International Application No. PCT/CN2012/079584, filed on Aug. 2, 2012, which is hereby incorporated by reference in its entirety.

TECHNICAL FIELD

The present invention relates to the field of communications technologies, and in particular, to a convergence terminal and a method for providing multi-service by the convergence terminal.

BACKGROUND

With the continuous development of sciences and technologies, demands of a consumer in the home field are also continuously expanded, such as, enjoying Internet access pleasures brought by a home gateway (HGW) of a home local area network, and watching a digital television program (such as Digital Video Broadcasting (DVB)) on a television set through a set top box (STB).

In an existing common practice, a home gateway and a set top box each have an independent access software platform operating system, and their respective services are also isolated from each other.

The prior art has the following disadvantages: In the prior art, a home gateway and a set top box each have an independent access software platform operating system, and their respective services are also isolated from each other, so when a consumer needs to enjoy different services, the consumer needs to use a plurality of different service terminals, and then separately performs independent operations and use, which increase frequent operations of the consumer on the plurality of service terminals.

SUMMARY

A convergence terminal and a method for providing multi-service by the convergence terminal are provided, so as to implement that a television service and an Internet access service are separately provided through a service terminal.

In a first aspect, a convergence terminal is disclosed, where the convergence terminal externally connects to a television signal input source and a network signal input source, and establishes a communication connection with each of a multimedia device, an Internet access device, and a remote control, and the convergence terminal includes a set top box unit, a home gateway unit, a main control board and an interconnection backplane, where the set top box unit externally connects to the television signal input source, and is configured to provide a television service; the home gateway unit externally connects to the network signal input source, and is configured to provide an Internet access service; and the main control board establishes a communication connection with each of the multimedia device and the Internet access device, the main control board connects, in a communication manner, to each of the set top box unit and the home gateway unit through the interconnection backplane, and the main control board is configured to control, when receiving a control signal for controlling the set top box unit sent by the remote control, through a control interconnection bus and a multimedia interconnection bus in the interconnection backplane, the set top box unit to provide a television service for the multimedia device, and configured to control, through the control interconnection bus and an internet protocol (IP) network interconnection bus in the interconnection backplane based on an Internet access parameter of a user, the home gateway unit to provide an Internet access service for the Internet access device.

In a first possible implementation manner, when the main control board provides a television service, the main control board is further configured to control, through the control interconnection bus, the set top box unit to output a television signal of the television service, receive, through the multimedia interconnection bus, the television signal output by the set top box unit, and output the received television signal to the multimedia device.

In a second possible implementation manner, the main control board includes a bus slot, and the bus slot includes a multimedia interconnection bus port, a control interconnection bus port and an IP network interconnection bus port; the set top box unit connects, in a communication manner, to the multimedia interconnection bus port through the multimedia interconnection bus in the interconnection backplane, and connects, in a communication manner, to the control interconnection bus port through the control interconnection bus in the interconnection backplane; the home gateway unit connects, in a communication manner, to the control interconnection bus port through the control interconnection bus in the interconnection backplane, and connects, in a communication manner, to the IP network interconnection bus port through the IP network interconnection bus in the interconnection backplane.

In a third possible implementation manner, the main control board further includes a first bus slot and a second bus slot, the first bus slot connects, in a communication manner, to the set top box unit, and the second bus slot connects, in a communication manner, to the home gateway unit, where the first bus slot includes a multimedia interconnection bus port, a control interconnection bus port and an IP network interconnection bus port, and the second bus slot includes a multimedia interconnection bus port, a control interconnection bus port and an IP network interconnection bus port; the set top box unit connects, in a communication manner, to the multimedia interconnection bus port in the first bus slot through the multimedia interconnection bus in the interconnection backplane, and connects, in a communication manner, to the control interconnection bus port in the first bus slot through the control interconnection bus in the interconnection backplane; the home gateway unit connects, in a communication manner, to the control interconnection bus port in the second bus slot through the control interconnection bus in the interconnection backplane, and connects, in a communication manner, to the IP network interconnection bus port in the second bus slot through the IP network interconnection bus in the interconnection backplane.

In combination with the second or third possible implementation manner of the first aspect, in a fourth possible implementation manner, the main control board further includes a multimedia signal switching circuit unit, a processor, a multimedia signal output port, and a remote control signal transceiver circuit unit, where the processor connects, in a communication manner, to each of the control interconnection bus port, the multimedia signal switching circuit unit and the remote control signal transceiver circuit unit, the multimedia signal switching circuit unit connects, in a communication manner, to each of the multimedia interconnection bus port and the multimedia signal output port, the multimedia signal output port connects, in a communication manner, to the multimedia device, and the remote control signal transceiver circuit unit connects, in a communication manner, to the remote control.

In combination with the fourth possible implementation manner of the first aspect, in a fifth possible implementation manner, the multimedia signal switching circuit unit is configured to switch a multimedia signal input of the processor and a multimedia signal input of the multimedia interconnection bus port under the control of the processor, where a multimedia signal of the processor is a multimedia signal of a user main control interface, and a multimedia signal of the multimedia interconnection bus port is a television signal of the set top box unit and a multimedia signal of a main control interface of a set top box.

In combination with the fourth or fifth possible implementation manner of the first aspect, in a sixth possible implementation manner, the processor is configured to control, when receiving, through the remote control signal transceiver circuit unit, a request signal which is for selecting a set top box service and is sent by the remote control, the multimedia signal switching circuit unit to switch a current multimedia signal input of the processor to the multimedia signal input of the multimedia interconnection bus port, so as to output the multimedia signal of the main control interface of the set top box to the multimedia device.

In combination with the fourth to sixth possible implementation manners of the first aspect, in a seventh possible implementation manner, the processor is further configured to control, when receiving, through the remote control signal transceiver circuit unit, a control signal for operating the main control interface of the set top box sent by the remote control, the set top box unit to output the television signal to the multimedia device via the multimedia interconnection bus port, the multimedia signal switching circuit unit and the multimedia signal output port.

In combination with the fourth to seventh possible implementation manners of the first aspect, in an eighth possible implementation manner, the processor is further configured to control, when receiving, through the remote control signal transceiver circuit unit, a control signal for returning to the user main control interface sent by the remote control, the multimedia signal switching circuit unit to switch a current multimedia signal input of the multimedia interconnection bus port to the multimedia signal input of the processor.

In combination with the second to eighth possible implementation manners of the first aspect, in a ninth possible implementation manner, the set top box unit further connects, in a communication manner, to the IP network interconnection bus port through the IP network interconnection bus in the interconnection backplane, and the main control board is further configured to encrypt, through the IP network interconnection bus, data provided by the set top box unit, so as to maintain content copyright management.

In combination with the first to ninth possible implementation manners of the first aspect, in a tenth possible implementation manner, the main control board is further configured to implement system state control on the home gateway unit through the control interconnection bus.

In combination with the first to tenth possible implementation manners of the first aspect, in an eleventh possible implementation manner, when the main control board provides an Internet access service, the main control board is further configured to implement a system parameter configuration on the home gateway unit through the IP network interconnection bus, and provide, after the system parameter configuration is successful, an Internet access service for the Internet access device through the IP network interconnection bus.

In combination with the eleventh possible implementation manner of the first aspect, in a twelfth possible implementation manner, the main control board is further configured to perform, after the system parameter configuration is successful, Ethernet packet exchange processing on IP data provided by the home gateway unit, and then forward the processed data to the Internet access device.

In combination with the second to twelfth possible implementation manners of the first aspect, in a thirteenth possible implementation manner, the main control board further includes an Ethernet exchange circuit unit and a network signal transceiver circuit unit, the Ethernet exchange circuit unit connects, in a communication manner, to each of the processor, the network signal transceiver circuit unit and the IP network interconnection bus port, the processor connects, in a communication manner, to the IP network interconnection bus port, and the network signal transceiver circuit unit connects, in a communication manner, to the Internet access device.

In combination with the thirteenth possible implementation manner of the first aspect, in a fourteenth possible implementation manner, the processor is further configured to receive, through the IP network interconnection bus port, a current system state and a current system parameter configuration reported by the home gateway unit, and forward a network state in the current system state to the Internet access device via the Ethernet exchange circuit unit and the network signal transceiver circuit unit in sequence.

In combination with the fourteenth possible implementation manner of the first aspect, in a fifteenth possible implementation manner, the processor is further configured to receive, through the Ethernet exchange circuit unit and the network signal transceiver circuit unit, an Internet access parameter sent by the Internet access device, perform a system parameter configuration on the home gateway unit through the IP network interconnection bus port, refresh, after the system parameter configuration is successful, the network state in the current system state, and forward the refreshed network state to the Internet access device.

In combination with the fifteenth possible implementation manner of the first aspect, in a sixteenth possible implementation manner, the Ethernet exchange circuit unit is configured to perform Ethernet packet processing on the IP data provided by the home gateway unit, and forward the processed data to the Internet access device via the network signal transceiver circuit unit.

In combination with the fourteenth to sixteenth possible implementation manners of the first aspect, in a seventeenth possible implementation manner, the Ethernet exchange circuit unit further connects, in a communication manner, to a Power Line Connection (PLC) access gateway, and is configured to perform Ethernet packet processing on a network data packet of the PLC access gateway, and forward the processed data to the Internet access device via the network signal transceiver circuit unit.

In combination with the fourteenth to sixteenth possible implementation manners of the first aspect, in an eighteenth possible implementation manner, the Ethernet exchange circuit unit further connects, in a communication manner, to a G.hn access gateway, and is configured to perform Ethernet packet processing on a network data packet of the G.hn access gateway, and forward the processed data to the Internet access device via the network signal transceiver circuit unit.

In combination with the fourteenth to sixteenth possible implementation manners of the first aspect, in a nineteenth possible implementation manner, the main control board further includes a PLC access port, and the Ethernet exchange circuit unit further connects, in a communication manner, to the PLC access gateway through the PLC access port, and is configured to perform Ethernet packet processing on a network data packet of the PLC access gateway, and forward the processed data to the Internet access device via the network signal transceiver circuit unit.

In combination with the fourteenth to sixteenth possible implementation manners of the first aspect, in a twentieth possible implementation manner, the main control board further includes a G.hn access port, and the Ethernet exchange circuit unit further connects, in a communication manner, to the G.hn access gateway through the G.hn access port, and is configured to perform Ethernet packet processing on a network data packet of the G.hn access gateway, and forward the processed data to the Internet access device via the network signal transceiver circuit unit.

In a second aspect, a convergence terminal is disclosed, where the convergence terminal externally connects to different types of television signal input sources, and establishes a communication connection with a multimedia device, and the convergence terminal includes a first set top box unit, a second set top box unit, a main control board and an interconnection backplane, where the first set top box unit externally connects to a first type of television signal input source, and is configured to provide a first type of television service; the second set top box unit externally connects to a second type of television signal input source, and is configured to provide a second type of television service; and the main control board establishes a communication connection with the multimedia device, the main control board connects, in a communication manner, to each of the first set top box unit and the second set top box unit through the interconnection backplane, and the main control board is configured to control, according to a control signal for controlling the first set top box unit or the second set top box unit sent by a remote control, the first set top box unit or the second set top box unit to provide a television service of a television signal input source of a corresponding type for the multimedia device.

In a first possible implementation manner, the main control board is further configured to control, through a control interconnection bus, the first set top box unit or the second set top box unit to output a television signal of a television service of a corresponding type, receive, through a multimedia interconnection bus, the television signal of the television service of the corresponding type output by the first set top box unit or the second set top box unit, and output the received television signal to the multimedia device.

In a second possible implementation manner, the main control board includes a bus slot, and the bus slot includes a multimedia interconnection bus port, a control interconnection bus port and an IP network interconnection bus port; the first set top box unit connects, in a communication manner, to the multimedia interconnection bus port through the multimedia interconnection bus in the interconnection backplane, and connects, in a communication manner, to the control interconnection bus port through the control interconnection bus in the interconnection backplane; the second set top box unit connects, in a communication manner, to the multimedia interconnection bus port through the multimedia interconnection bus in the interconnection backplane, and connects, in a communication manner, to the control interconnection bus port through the control interconnection bus in the interconnection backplane.

In a third possible implementation manner, the main control board further includes a first bus slot and a second bus slot, the first bus slot connects, in a communication manner, to the first set top box unit, and the second bus slot connects, in a communication manner, to the second set top box unit, where the first bus slot includes a multimedia interconnection bus port, a control interconnection bus port and an IP network interconnection bus port, and the second bus slot includes a multimedia interconnection bus port, a control interconnection bus port and an IP network interconnection bus port; the first set top box unit connects, in a communication manner, to the multimedia interconnection bus port in the first bus slot through the multimedia interconnection bus in the interconnection backplane, and connects, in a communication manner, to the control interconnection bus port in the first bus slot through the control interconnection bus in the interconnection backplane; the second set top box unit connects, in a communication manner, to the multimedia interconnection bus port in the second bus slot through the multimedia interconnection bus in the interconnection backplane, and connects, in a communication manner, to the control interconnection bus port in the second bus slot through the control interconnection bus in the interconnection backplane.

In combination with the first or second possible implementation manner of the second aspect, in a fourth possible implementation manner, the main control board further includes a multimedia signal switching circuit unit, a processor, a multimedia signal output port, and a remote control signal transceiver circuit unit, where the processor connects, in a communication manner, to each of the control interconnection bus port, the multimedia signal switching circuit unit and the remote control signal transceiver circuit unit, the multimedia signal switching circuit unit connects, in a communication manner, to each of the multimedia interconnection bus port and the multimedia signal output port, the multimedia signal output port connects, in a communication manner, to the multimedia device, and the remote control signal transceiver circuit unit connects, in a communication manner, to the remote control.

In combination with the fourth possible implementation manner of the second aspect, in a fifth possible implementation manner, the multimedia signal switching circuit unit is configured to switch a multimedia signal input of the processor and a multimedia signal input of the multimedia interconnection bus port under the control of the processor, where a multimedia signal of the processor is a multimedia signal of a user main control interface, and a multimedia signal of the multimedia interconnection bus port is a television signal of the first set top box unit or the second set top box unit, and a multimedia signal of a main control interface of the first set top box unit or the second set top box unit.

In combination with the fourth or fifth possible implementation manner of the second aspect, in a sixth possible implementation manner, the processor is configured to control, when receiving, through the remote control signal transceiver circuit unit, a request signal which is for selecting a first set top box service or a second set top box service and is sent by the remote control, the multimedia signal switching circuit unit to switch a current multimedia signal input of the processor to the multimedia signal input of the multimedia interconnection bus port, so as to output the multimedia signal of the main control interface of the first set top box unit or the second set top box unit to the multimedia device.

In combination with the fourth to sixth possible implementation manners of the second aspect, in a seventh possible implementation manner, the processor is further configured to control, when receiving, through the remote control signal transceiver circuit unit, a control signal for operating the main control interface of the first set top box unit or the second set top box unit sent by the remote control, a corresponding set top box unit to output the television signal to the multimedia device via the multimedia interconnection bus port, the multimedia signal switching circuit unit and the multimedia signal output port.

In combination with the fourth to seventh possible implementation manners of the second aspect, in an eighth possible implementation manner, the processor is further configured to control, when receiving, through the remote control signal transceiver circuit unit, a control signal for returning to the user main control interface sent by the remote control, the multimedia signal switching circuit unit to switch a current multimedia signal input of the multimedia interconnection bus port to the multimedia signal input of the processor.

In combination with the fourth to eighth possible implementation manners of the second aspect, in a ninth possible implementation manner, the first set top box unit or the second set top box unit further connects, in a communication manner, to the IP network interconnection bus port through an IP network interconnection bus in the interconnection backplane, and the main control board is further configured to encrypt, through the IP network interconnection bus, data provided by the set top box unit, so as to maintain content copyright management.

In a third aspect, a method for providing multi-service is disclosed, where the method is applied to a convergence terminal including a set top box and a home gateway, the convergence terminal establishes a communication connection with each of a remote control, a multimedia device and an Internet access device, the set top box of the convergence terminal externally connects to a television signal input source, the home gateway of the convergence terminal externally connects to a network signal input source, and the method includes controlling, by the convergence terminal according to a control signal for controlling the set top box sent by the remote control, the set top box to provide a television service in the television signal input source for the multimedia device; and meanwhile controlling, by the convergence terminal according to an Internet access parameter of a user, the home gateway to provide an Internet access service of the network signal input source for the Internet access device.

In a first possible implementation manner, the step of controlling, according to a control signal for controlling the set top box sent by the remote control, the set top box to provide a television service in the television signal input source for the multimedia device includes interrupting, when receiving a request signal which is for selecting a set top box service and is sent by the remote control, outputting a multimedia signal of a user main control interface of the convergence terminal to the multimedia device; and controlling the set top box to output a multimedia signal of a main control interface of the set top box to the multimedia device.

In combination with the first possible implementation manner of the third aspect, in a second possible implementation manner, the step of controlling, according to a control signal for controlling the set top box sent by the remote control, the set top box to provide a television service in the television signal input source for the multimedia device further includes controlling, when receiving a control signal for operating a main control interface of the set top box sent by the remote control, the set top box to output a television signal in the television signal input source to the multimedia device.

In combination with the first possible implementation manner of the third aspect, in a third possible implementation manner, the step of controlling, according to a control signal for controlling the set top box sent by the remote control, the set top box to provide a television service in the television signal input source for the multimedia device further includes interrupting, when receiving a control signal for returning to the user main control interface sent by the remote control, outputting the multimedia signal of the main control interface of the set top box to the multimedia device; and outputting the multimedia signal of the user main control interface of the convergence terminal to the multimedia device.

In a fourth possible implementation manner, the step of controlling, according to an Internet access parameter of a user, the home gateway to provide an Internet access service of the network signal input source for the Internet access device includes sending a network state of the home gateway to the Internet access device; receiving an Internet access parameter of a user sent, according to the network state, by the Internet access device; performing a system parameter configuration on the home gateway according to the Internet access parameter; and providing, after the system parameter configuration is successful, an Internet access service of the network signal input source for the Internet access device through the home gateway.

In combination with the fourth possible implementation manner of the third aspect, in a fifth possible implementation manner, the step of providing, after the system parameter configuration is successful, an Internet access service of the network signal input source for the Internet access device through the home gateway includes updating, after the system parameter configuration is successful, the network state of the home gateway; sending the updated network state to the Internet access device; and performing Ethernet packet processing on IP data which is in the network signal input source and is provided by the home gateway, and forwarding the processed data to the Internet access device; or performing Ethernet packet processing on data sent by the Internet access device, and forwarding the processed data to the home gateway.

In a sixth possible implementation manner, the convergence terminal establishes a communication connection with a PLC access gateway, and the method further includes performing Ethernet packet processing on a network data packet of the PLC access gateway, and forwarding the processed data to the Internet access device; or performing Ethernet packet processing on data sent by the Internet access device, and forwarding the processed data to the PLC access gateway.

In a seventh possible implementation manner, the convergence terminal establishes a communication connection with a G.hn access gateway, and the method further includes performing Ethernet packet processing on a network data packet of the G.hn access gateway, and forwarding the processed data to the Internet access device; or performing Ethernet packet processing on data sent by the Internet access device, and forwarding the processed data to the G.hn access gateway.

In a fourth aspect, a method for providing multi-service is disclosed, where the method is applied to a convergence terminal including a first set top box and a second set top box, the convergence terminal establishes a communication connection with each of a remote control, and a multimedia device, the first set top box of the convergence terminal externally connects to a first type of television signal input source, the second set top box of the convergence terminal externally connects to a second type of television signal input source, and the method includes controlling, by the convergence terminal according to a control signal for controlling the first set top box or the second set top box sent by the remote control, the first set top box or the second set top box to provide a television service of a television signal input source of a corresponding type for the multimedia device.

In a first possible implementation manner, the step of controlling, by the convergence terminal according to a control signal for controlling the first set top box or the second set top box sent by the remote control, the first set top box or the second set top box to provide a television service of a television signal input source of a corresponding type for the multimedia device includes interrupting, when receiving a request signal which is for selecting a first set top box service or a second set top box service and is sent by the remote control, outputting a multimedia signal of a user main control interface of the convergence terminal to the multimedia device; and controlling the first set top box or the second set top box to output a multimedia signal of a main control interface of the set top box to the multimedia device.

In combination with the first possible implementation manner of the fourth aspect, in a second possible implementation manner, the step of controlling, by the convergence terminal according to a control signal for controlling the first set top box or the second set top box sent by the remote control, the first set top box or the second set top box to provide a television service of a television signal input source of a corresponding type for the multimedia device further includes controlling, when receiving a control signal for operating a main control interface of the set top box sent by the remote control, the set top box to output a television signal in a television signal input source of a corresponding type to the multimedia device.

In combination with the first possible implementation manner of the fourth aspect, in a third possible implementation manner, the step of controlling, by the convergence terminal according to a control signal for controlling the first set top box or the second set top box sent by the remote control, the first set top box or the second set top box to provide a television service of a television signal input source of a corresponding type for the multimedia device further includes interrupting, when receiving a control signal for returning to the user main control interface sent by the remote control, outputting the multimedia signal of the main control interface of the first set top box or the second set top box to the multimedia device; and outputting the multimedia signal of the user main control interface of the convergence terminal to the multimedia device.

Through the provided convergence terminal, the main control board in the convergence terminal controls the set top box unit in the convergence terminal to implement a television service, and the main control board controls the home gateway unit in the convergence terminal to implement an Internet access service, thereby implementing that the television service and the Internet access service are separately provided through a service terminal.

BRIEF DESCRIPTION OF DRAWINGS

To illustrate the technical solutions in the embodiments of the present invention more clearly, accompanying drawings required for describing the embodiments are introduced briefly in the following. The accompanying drawings in the following description are only some embodiments of the present invention, and persons of ordinary skill in the art may further derive other drawings according to these accompanying drawings without creative efforts.

DESCRIPTION OF EMBODIMENTS

The technical solutions in the embodiments of the present invention are clearly described in the following with reference to the accompanying drawings in the embodiments of the present invention. Obviously, the embodiments to be described are only a part rather than all of the embodiments of the present invention. All other embodiments obtained by persons of ordinary skill in the art based on the embodiments of the present invention without creative efforts shall fall within the protection scope of the present invention.

The technical solutions in the embodiments of the present invention are clearly described in the following with reference to the accompanying drawings in the embodiments of the present invention.

Figure 1:
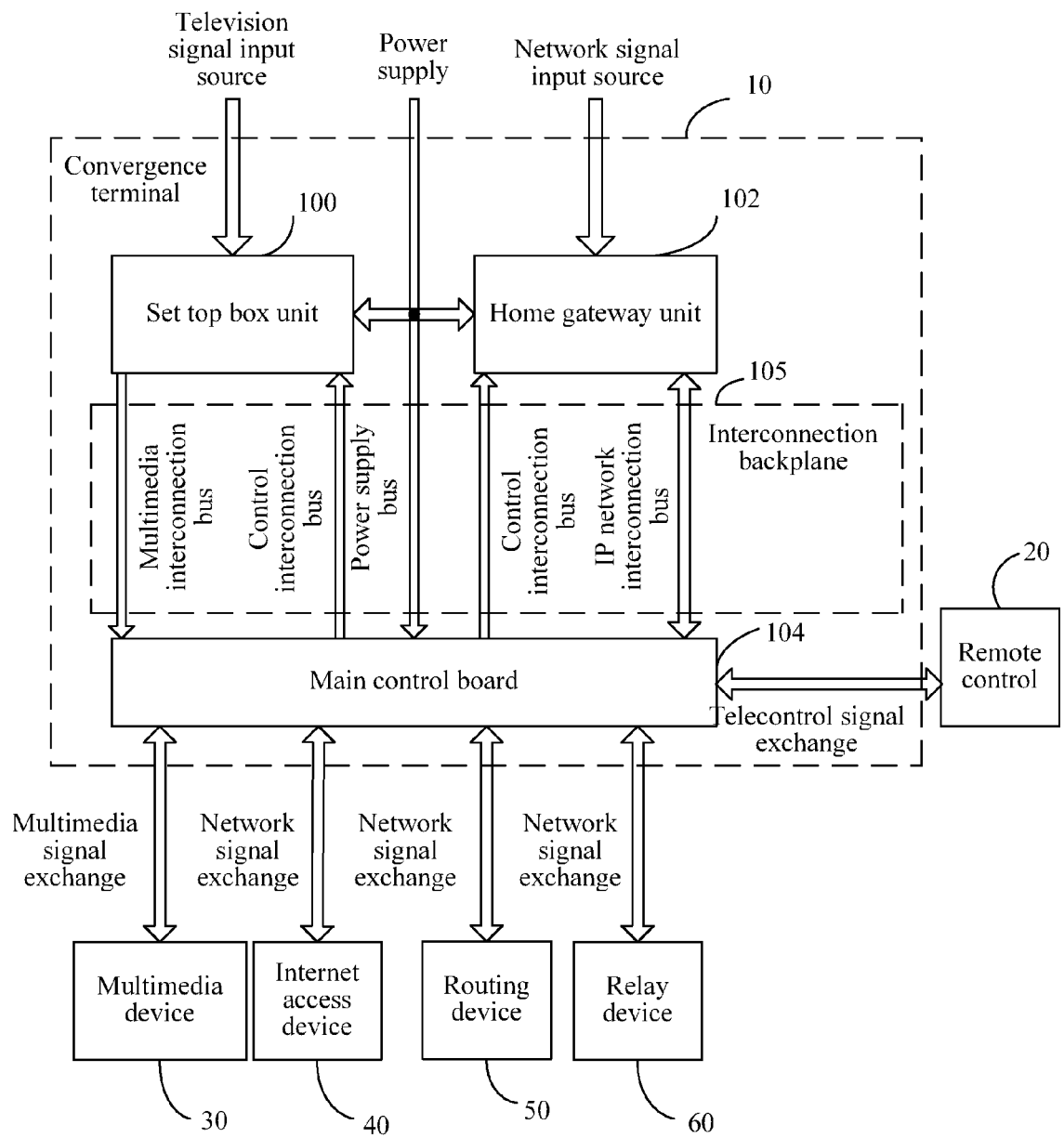
FIG. 1 is a diagram of an application system architecture of a convergence terminal according to Embodiment 1.

FIG. 1 is a diagram of an application system architecture of a convergence terminal according to Embodiment 1.

In this embodiment, a convergence terminal 10 may externally connect to a television signal input source and a network signal input source. In this embodiment, the television signal input source may provide a DVB service for the convergence terminal 10 through a cable, and the network signal input source may provide an Internet signal of a fixed network for the convergence terminal 10 through a telephone line.

In this embodiment, the convergence terminal 10 may further exchange a remote control signal with a remote control 20, may also exchange a multimedia signal with a multimedia device 30, and may also exchange a network signal with an Internet access device 40 or a routing device 50 or a relay device 60. In this embodiment, the multimedia device 30 may include a television set, or a multimedia sounder; the Internet access device 40 may be a personal computer (PC), or a tablet computer, or a smartphone; the routing device 50 may be a router, or a switch; the relay device 60 may be a repeater. In this embodiment, the convergence terminal 10 may be a terminal providing a television service and an Internet access service.

In this embodiment, the convergence terminal 10 may connect to the multimedia device 30 through a high definition multimedia interface (HDMI), or may also connect to the multimedia device 30 through a digital visual interface (DVI) and a digital audio interface (DAI).

In this embodiment, the convergence terminal 10 may connect, in a communication manner, to the Internet access device 40, the routing device 50 and the relay device 60 in a wired or wireless local area network (WLAN) port manner.

In this embodiment, the convergence terminal 10 may connect, in a communication manner, to the remote control 20 in an infrared ray (IR) or a radio frequency (RF) or a Bluetooth manner.

In this embodiment, the convergence terminal 10 includes a set top box unit 100, a home gateway unit 102, a main control board 104, and an interconnection backplane 105. In this embodiment, each of the set top box unit 100, the home gateway unit 102, the main control board 104, and the interconnection backplane 105 may be located on one printed circuit board (PCB) separately, the set top box unit 100, the home gateway unit 102 and the main control board 104 may also be integrated on one board, or the set top box unit 100 and the home gateway unit 102 may also be integrated on one board.

In this embodiment, the interconnection backplane 105 includes a multimedia interconnection bus, a control interconnection bus, an IP network interconnection bus, and a power supply bus. In this embodiment, an external power supply provides a power source for each of the set top box unit 100, the home gateway unit 102 and the main control board 104 through the power supply bus.

The set top box unit 100 connects, in a communication manner, to the main control board 104 through the multimedia interconnection bus and the control interconnection bus, and the home gateway unit 102 connects, in a communication manner, to the main control board 104 through the control interconnection bus and the IP network interconnection bus.

In this embodiment, the main control board 104 is configured to control the set top box unit 100 through the control interconnection bus, output a television signal converted by the set top box unit 100 to the main control board 104 through the multimedia interconnection bus, and output the converted television signal to the multimedia device 30. In this embodiment, when receiving a control signal for controlling a set top box sent by the remote control 20, the main control board 104 may send, through the control interconnection bus, the control signal for controlling a set top box to the set top box unit 100, the set top box unit 100 sends the converted television signal to the main control board 104 through the multimedia interconnection bus after receiving the control signal for controlling a set top box, and the main control board 104 then outputs the received converted television signal to the multimedia device 30. In this embodiment, the control signal for controlling a set top box may not be limited to a control signal for switching a program channel, a control signal for searching for a program channel, a control signal for adjusting a program sound, a control signal for a program on demand, a control signal for playing a television program and the like.

In this embodiment, the set top box unit 100 is configured to perform signal conversion on a source television signal provided by the television signal input source, output, under the control of the main control board 104 through the control interconnection bus, the converted television signal to the main control board 104 through the multimedia interconnection bus, and then the main control board 104 outputs the television signal to the multimedia device 30 so as to play the television signal. In this embodiment, a function implemented by the set top box unit 100 is the same as that of a set top box product in the prior art. For example, a compressed digital signal in a source television signal is converted into television content, and the television content is displayed on a multimedia device. Furthermore, an electronic program guide, an Internet webpage, a subtitle and the like may also be correspondingly converted, and then displayed on the multimedia device.

An example is taken for description in the following. In this embodiment, when a user starts up and uses the convergence terminal 10, the main control board 104 in the convergence terminal 10 provides a user main control interface (UI), and outputs the user main control interface to the multimedia device 30 (taking a television set as an example), and names of a plurality of service modules, such as a set top box service module and a home gateway service module, are displayed on the user main control interface. When the user needs to watch television, the user selects the set top box service module through the remote control 20. In this case, the remote control 20 sends a request signal for selecting a set top box service, and after receiving the request signal which is for selecting a set top box service and is sent by the remote control 20, the main control board 104 controls, based on the request signal for selecting a set top box service, the set top box unit 100 to output a main control interface of the set top box to the television. Later, the user may send, through the remote control 20, a control signal for operating the main control interface of the set top box again, and operate, through the main control board 104, functions provided in the main control interface of the set top box, such as, channel search, channel switching, volume adjustment, program on demand, and television program play.

In this embodiment, the main control board 104 is further configured to implement system state control on the home gateway unit 102 through the control interconnection bus, and implement a system parameter configuration on the home gateway unit 102 through the IP network interconnection bus, and provide a network service of the home gateway unit 102 for the Internet access device 40 or the routing device 50 or the relay device 60 through the IP network interconnection bus.

It may be understood that, when the main control board 104 controls the set top box unit 100 and the home gateway unit 102 through the control interconnection bus separately, the main control board 104 may distinguish control signals, so as to control the set top box unit 100 and the home gateway unit 102 separately. An identification signal for controlling the set top box unit 100 or controlling the home gateway unit 102 may also be carried in a control signal.

In this embodiment, taking the Internet access device 40 as an example, the home gateway unit 102 is configured to provide the Internet access device 40 with a function of implementing Internet access, and provide the Internet access device 40 with a function of route exchange and IP address allocation. In this embodiment, the home gateway unit 102 has same functions as those of a home gateway (such as, an asymmetrical digital subscriber line (ADSL), and a digital subscriber line (XDSL)) in the prior art, and therefore, details are not described again one by one here.

An example is taken for description in the following. In this embodiment, when the user starts up and uses the convergence terminal 10, the home gateway unit 102 is also powered on and started. In this case, the home gateway unit 102 reports a current system state and a current system parameter configuration of the home gateway unit 102 to the main control board 104 through the IP network interconnection bus, and the main control board 104 then forwards the current network state of the home gateway unit 102 to the Internet access device 40. In this case, the user may input an Internet access parameter to the main control board 104 through the Internet access device 40, the main control board 104 then delivers the Internet access parameter to the home gateway unit 102 to perform a system parameter configuration. After the system parameter configuration is successful, a work state after the configuration is successful is reported to the main control board 104, and then the main control board 104 forwards the work state to the Internet access device 40. After that, the main control board 104 receives, through the IP network interconnection bus, IP data provided by the home gateway unit 102, then performs Ethernet packet exchange processing on the IP data, and then forwards the processed data to the Internet access device 40. In this embodiment, the current system state of the home gateway unit 102 may include a network state, a use state, a system halt state, delivery setting and the like of the home gateway, the current system parameter configuration may be a configuration of an Internet access parameter for accessing a network, and the Internet access parameter includes an Internet access account and an Internet access password.

In this embodiment, after the work state reported by the home gateway unit 102 is the hanging death state (crash), the main control board 104 performs reset operation control on the home gateway unit 102 through the control interconnection bus.

Through the convergence terminal 10 provided by this embodiment, the main control board in the convergence terminal 10 controls the set top box unit 100 in the convergence terminal 10 to implement a television service, and the main control board controls the home gateway unit 102 in the convergence terminal 10 to implement an Internet access service, so as to achieve an objective of implementing that the television service and the Internet access service are separately provided through a service terminal, thereby reducing the number of service terminals used by a user for enjoying different services, and also reducing frequent wiring operations of the user on connection wires for inward connection and outward connection.

An example is taken for detailed description in the following.

Figure 2:
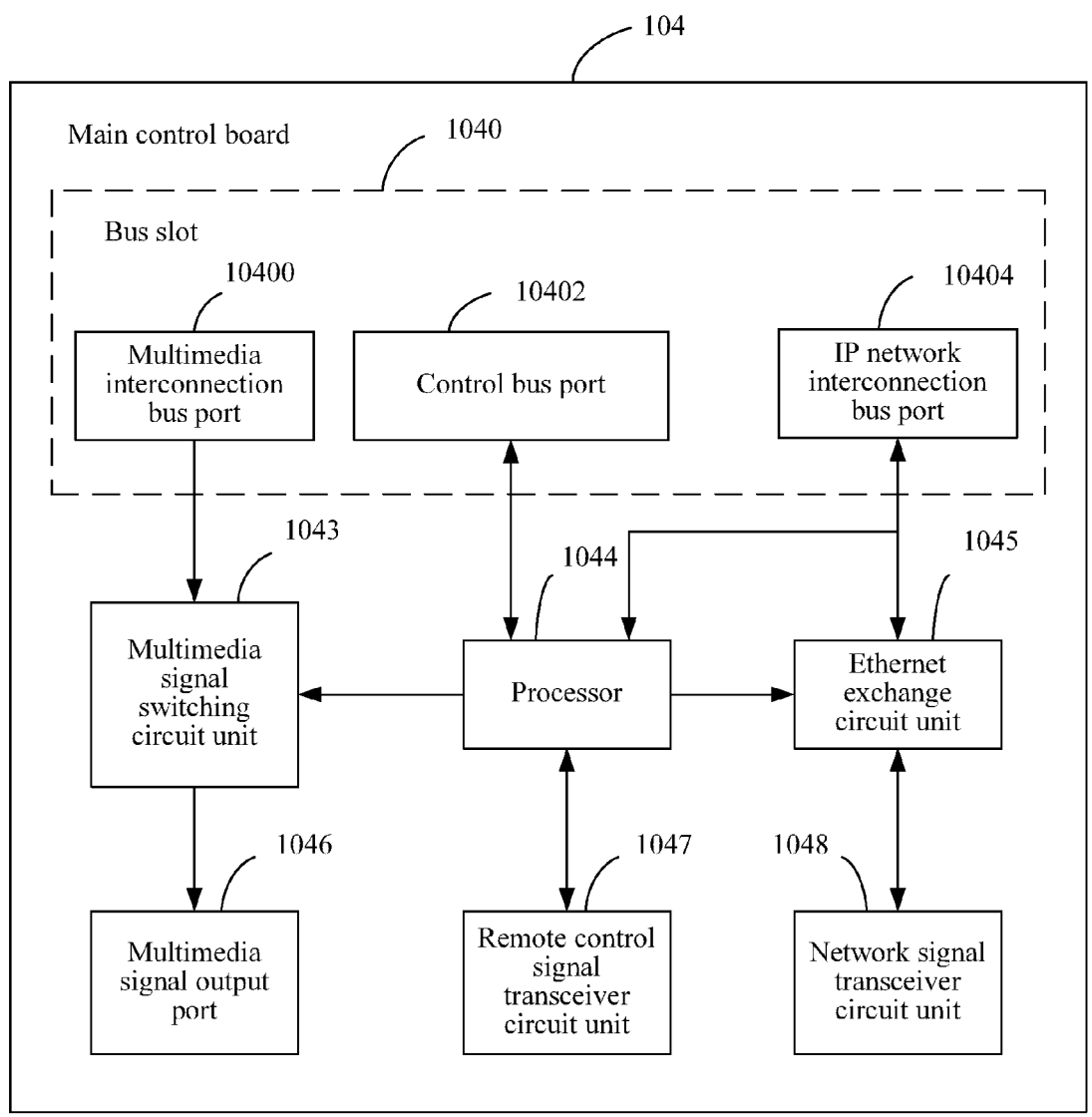
FIG. 2 is a diagram of a first structure of a main control board of the convergence terminal according to Embodiment 1.

FIG. 2 is a diagram of a first structure of a main control board of the convergence terminal according to Embodiment 1.

In this embodiment, the main control board 104 includes a bus slot 1040, a multimedia signal switching circuit unit 1043, a processor 1044, an Ethernet exchange circuit unit 1045, a multimedia signal output port 1046, a remote control signal transceiver circuit unit 1047, and a network signal transceiver circuit unit 1048.

In this embodiment, the bus slot 1040 connects, in a communication manner, to each of the multimedia signal switching circuit unit 1043, the processor 1044 and the Ethernet exchange circuit unit 1045, the processor 1044 connects, in a communication manner, to each of the multimedia signal switching circuit unit 1043, the Ethernet exchange circuit unit 1045, and the remote control signal transceiver circuit unit 1047, the multimedia signal switching circuit unit 1043 connects, in a communication manner, to the multimedia signal output port 1046, and the Ethernet exchange circuit unit 1045 connects, in a communication manner, to the network signal transceiver circuit unit 1048.

In this embodiment, the bus slot 1040 includes a multimedia interconnection bus port 10400, a control interconnection bus port (or control bus port) 10402, and an IP network interconnection bus port 10404. In this embodiment, the multimedia interconnection bus port 10400, the control interconnection bus port 10402, and the IP network interconnection bus port 10404 each may be an individual port, and may also be integrated into a bus port. In this embodiment, the multimedia interconnection bus port 10400 connects, in a communication manner, to the multimedia signal switching circuit unit 1043, the control interconnection bus port 10402 connects, in a communication manner, to the processor 1044, and the IP network interconnection bus port 10404 connects, in a communication manner, to the Ethernet exchange circuit unit 1045.

In this embodiment, the multimedia signal switching circuit unit 1043 may be a multi-input single-output switch circuit, may receive a multimedia signal sent by the processor 1044, and may also receive a multimedia signal sent by the multimedia interconnection bus port 10400. In this embodiment, the multimedia signal switching circuit unit 1043 is configured to switch a multimedia signal input of the processor 1044 and a multimedia signal input of the multimedia interconnection bus port 10400 under the control of the processor 1044. In this embodiment, the multimedia signal sent by the multimedia interconnection bus port 10400 is a multimedia signal of a television relevant to set top box conversion and a multimedia signal of a main control interface of the set top box which are sent by the set top box unit 100, and the multimedia signal may be an audio/video signal. The multimedia signal sent by the processor 1044 is a multimedia signal of a UI. In this embodiment, the multimedia interconnection bus port 10400 may be an HDMI input port, and may also be a DVI and an Sony/Philips digital interface format (SPDIF) input port.

In this embodiment, after the main control board 104 starts a power-on operation, a multimedia signal first output by the multimedia signal switching circuit unit 1043 is a multimedia signal of a UI of the processor 1044, and is output by the multimedia signal output port 1046 to the multimedia device 30. Names of a plurality of service modules, such as a set top box service module and a home gateway service module, are displayed on the user main control interface. In this embodiment, the multimedia signal output port 1046 may be an HDMI output port, and may also be a DVI and an SPDIF output port.

In this embodiment, the remote control signal transceiver circuit unit 1047 is configured to exchange a remote control signal with the remote control 20. The remote control signal transceiver circuit unit 1047 may be an infrared ray transceiver circuit, may also be a Bluetooth transceiver circuit, and may also be a radio frequency circuit.

When the user needs to watch television, the user selects the set top box service module through the remote control 20, and the remote control 20 sends the request signal for selecting a set top box service. After the remote control signal transceiver circuit unit 1047 receives the request signal which is for selecting a set top box service and is sent by the remote control 20, in one aspect, the processor 1044 controls, based on the request signal for selecting a set top box service, the set top box unit 100 to output the main control interface of the set top box, and in another aspect, the processor 1044 controls the multimedia signal switching circuit unit 1043 to switch a current multimedia signal input to a multimedia signal input of the multimedia interconnection bus port 10400, namely, sends the main control interface output by the set top box to the multimedia device 30 via the multimedia signal output port 1046. Later, the processor 1044 notifies the remote control 20 of switching a current sending mode (in this case, a main control sending mode of the processor 1044) of the remote control 20 to an infrared ray sending mode of the set top box, which definitely may also be a Bluetooth sending mode or an RF sending mode. In this case, after switching the sending mode, the remote control 20 may receive an operation instruction of the user, namely, receive the control signal for operating the main control interface of the set top box, such as, channel switching, volume adjustment, and program on demand, forward an infrared ray key code corresponding to the operation instruction of the user to the processor 1044 via the remote control signal transceiver circuit unit 1047, and forward the infrared ray key code to the set top box unit 100 through the processor 1044. When the user does not need any service provided by the set top box, the user may operate a Home key, or a main control return key, or other keys which may instruct returning to the user main control interface of the processor 1044 in the remote control 20. In this case, the remote control 20 forwards a corresponding key code to the processor 1044 via the remote control signal transceiver circuit unit 1047, the processor 1044 controls the multimedia signal switching circuit unit 1043 to switch the current multimedia signal input to a multimedia signal input of the processor 1044, namely, sends the multimedia signal of the UI of the processor 1044 to the multimedia device 30 via the multimedia signal output port 1046, and then notifies the remote control 20 of switching the current sending mode to the main control sending mode of the processor 1044.

In this embodiment, the Ethernet exchange circuit unit 1045 may be an Ethernet packet exchange circuit, whose specific circuit may be obtained through the prior art, and is not described one by one again here. The Ethernet exchange circuit unit 1045 is configured to perform Ethernet packet exchange on the IP data provided, through the IP network interconnection bus port 10404, by the home gateway unit 102, and forward the exchanged data to the Internet access device 40, or the routing device 50, or the relay device 60 through the network signal transceiver circuit unit 1048.

In this embodiment, when the user starts up and uses the convergence terminal 10, the home gateway unit 102 is also powered on and started. In this case, the home gateway unit 102 reports the current system state and the current system parameter configuration of the home gateway unit 102 to the processor 1044 through the IP network interconnection bus port 10404, and the processor 1044 then forwards the current network state of the home gateway unit 102 to the Internet access device 40 via the Ethernet exchange circuit unit 1045 and the network signal transceiver circuit unit 1048 in sequence. In this case, the user may input an Internet access parameter through the Internet access device 40, and send the Internet access parameter to the processor 1044 via the network signal transceiver circuit unit 1048 and the Ethernet exchange circuit unit 1045 in sequence, and the processor 1044 then delivers the Internet access parameter to the home gateway unit 102 via the IP network interconnection bus port 10404 to perform a configuration. After the home gateway unit 102 is configured successfully, the work state after the configuration is successful is reported to the processor 1044 via the IP network interconnection bus port 10404, and then the processor 1044 refreshes the current network state of the home gateway unit 102, and forwards the refreshed network state to the Internet access device 40 via the Ethernet exchange circuit unit 1045 and the network signal transceiver circuit unit 1048 in sequence. After that, the Ethernet exchange circuit unit 1045 receives, through the IP network interconnection bus port 10404, IP data provided by the home gateway unit 102, then performs Ethernet packet exchange processing on the IP data, and then forwards the processed data to the Internet access device 40 via the network signal transceiver circuit unit 1048.

In this embodiment, after the work state reported by the home gateway unit 102 is the hanging death state (crash), the processor 1044 performs reset operation control on the home gateway unit 102 through the control interconnection bus port 10402.

Alternatively, the main control board 104 may include a hard disk (not shown) and a compact disc read-only memory (CD-ROM) drive (not shown), each of which connects, in a communication manner, to the processor 1044. In this embodiment, multimedia data may also be provided for the multimedia device 30 through the hard disk (not shown) and the CD-ROM drive (not shown), and a data storage service may also be provided for the user through the hard disk (not shown).

It may be understood that, when the processor 1044 in the main control board 104 controls the set top box unit 100 and the home gateway unit 102 through the control interconnection bus separately, the processor 1044 of the main control board 104 may distinguish control signals, so as to control the set top box unit 100 and the home gateway unit 102 separately. An identification signal for controlling the set top box unit 100 or controlling the home gateway unit 102 may also be carried in a control signal sent by the processor 1044.

Through the convergence terminal provided by the embodiment of the present invention, the processor in the main control board in the convergence terminal controls the set top box unit in the convergence terminal to implement a television service, and the processor in the main control board controls the home gateway unit in the convergence terminal to implement an Internet access service, so as to achieve an objective of implementing that the television service and the Internet access service are separately provided through a service terminal, thereby reducing the number of service terminals used by a user for enjoying different services, and also reducing frequent wiring operations of the user on connection wires for inward connection and outward connection.

Figure 3:
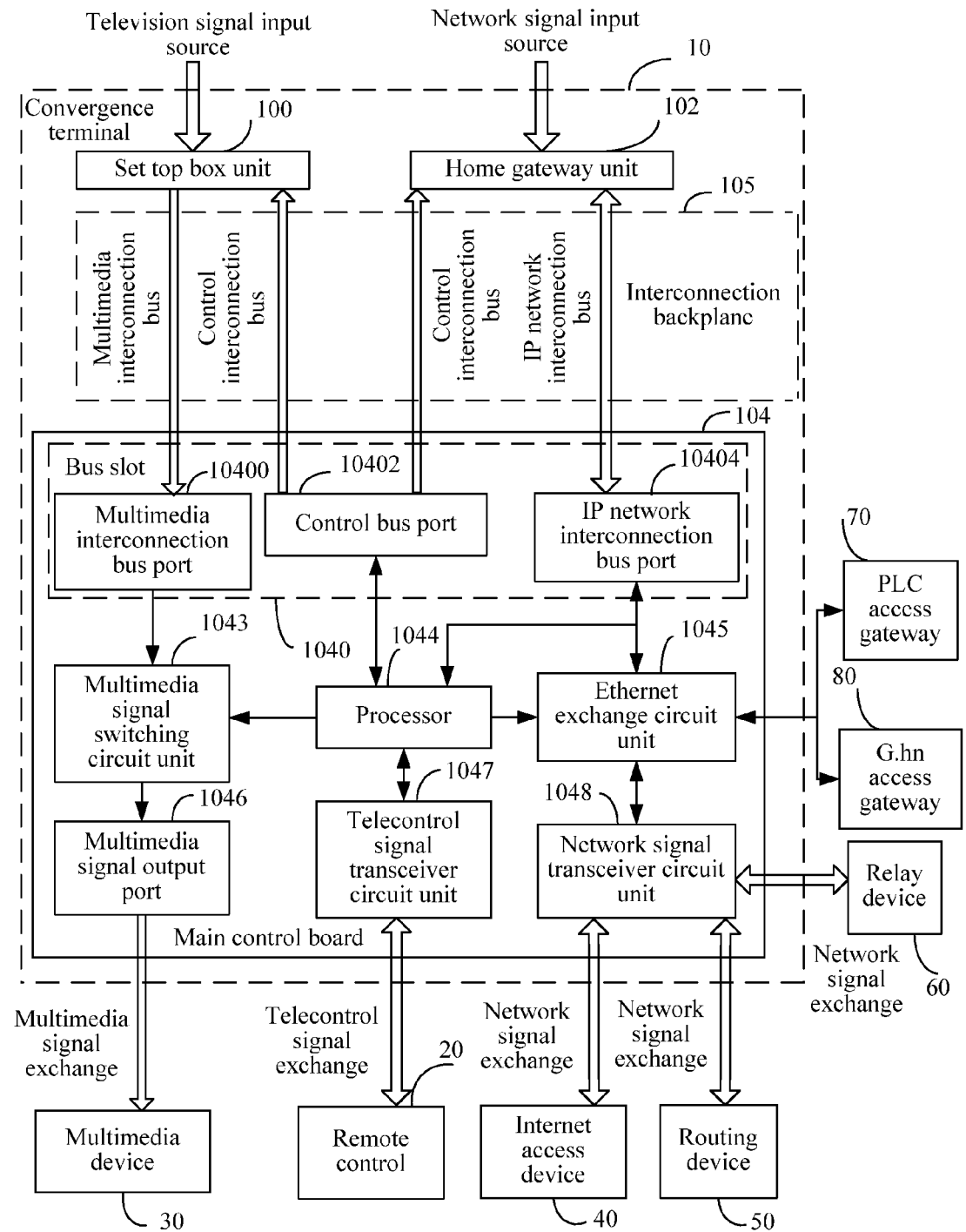
FIG. 3 is an application architecture diagram of the first structure of the main control board of the convergence terminal according to Embodiment 1.

FIG. 3 is an application architecture diagram of the first structure of the main control board of the convergence terminal according to Embodiment 1.

In this embodiment, the bus slot 1040 connects, in a communication manner, to the set top box unit 100 and the home gateway unit 102 through the interconnection backplane 105, where the multimedia interconnection bus port 10400 in the bus slot 1040 connects, in a communication manner, to the set top box unit 100 through the multimedia interconnection bus in the interconnection backplane 105, the control interconnection bus port 10402 connects, in a communication manner, to each of the set top box unit 100 and the home gateway unit 102 through the control interconnection bus in the interconnection backplane 105, and the IP network interconnection bus port 10404 connects, in a communication manner, to the home gateway unit 102 through the IP network interconnection bus in the interconnection backplane 105.

In this embodiment, the Ethernet exchange circuit unit 1045 may further directly connect, in a communication manner, to a PLC access gateway 70 or a G.hn access gateway 80, perform Ethernet packet exchange on a data packet provided by the PLC access gateway 70 or the G.hn access gateway 80, and forward the exchanged data to the Internet access device 40, the routing device 50, and the relay device 60. It may be understood that, the Ethernet exchange circuit unit 1045 itself provides a port through which the Ethernet exchange circuit unit 1045 directly connects, in a communication manner, to the PLC access gateway 70 or the G.hn access gateway 80. The PLC access gateway 70 is a power line gateway, and the G.hn access gateway is a power line interconnection protocol access gateway of the International Telecommunication Union (ITU).

Figure 4:
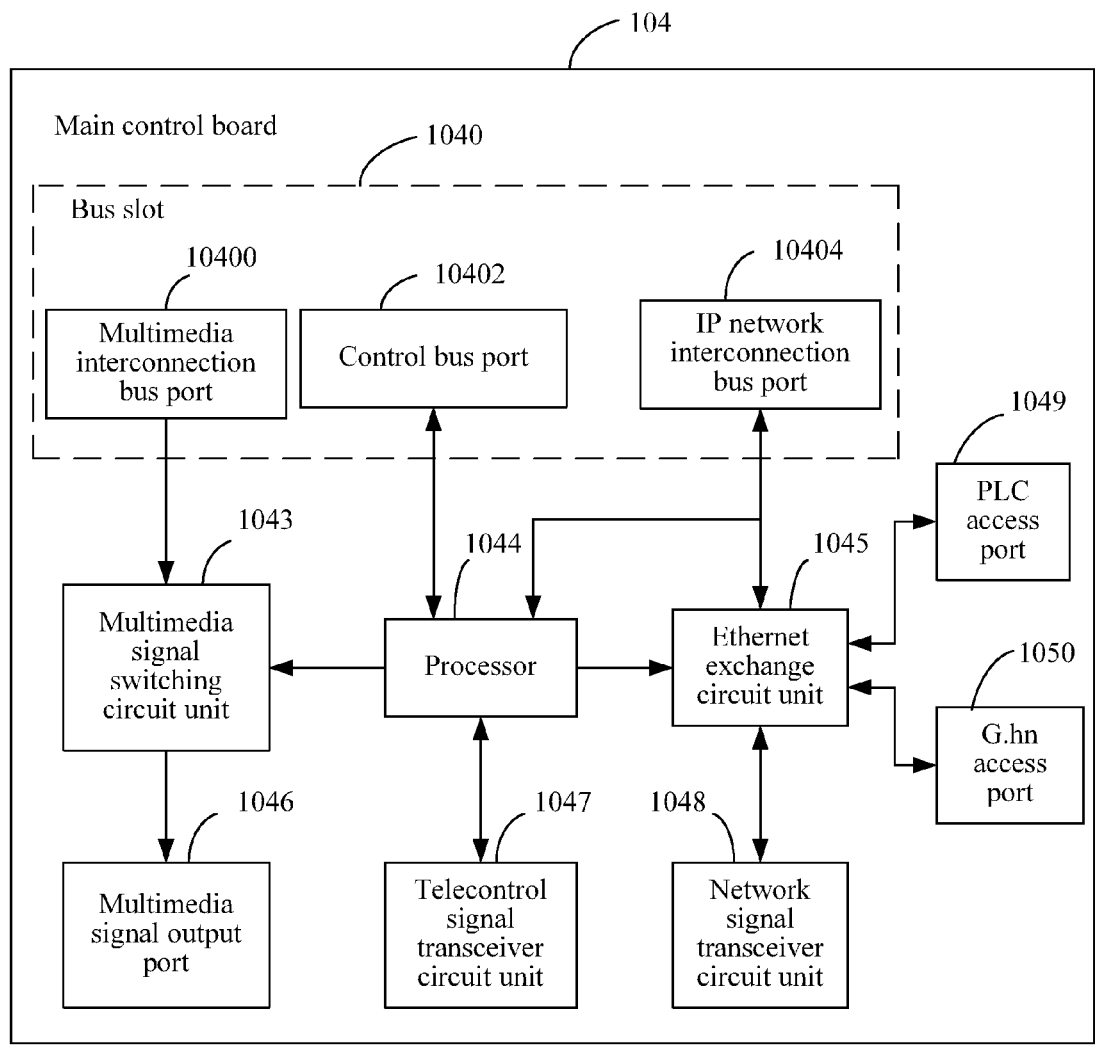
FIG. 4 is a diagram of a second structure of the main control board of the convergence terminal according to Embodiment 1.

FIG. 4 is a diagram of a second structure of the main control board of the convergence terminal according to Embodiment 1.

In this embodiment, a difference between FIG. 4 and FIG. 2 lies in that, the main control board 104 further includes a PLC access port 1049 and a G.hn access port 1050, and the PLC access port 1049 and the G.hn access port 1050 each connect, in a communication manner, to the Ethernet exchange circuit unit 1045. Other unit structures in FIG. 4 have the same functions as those of other unit structures with the same names in FIG. 2.

Figure 5:
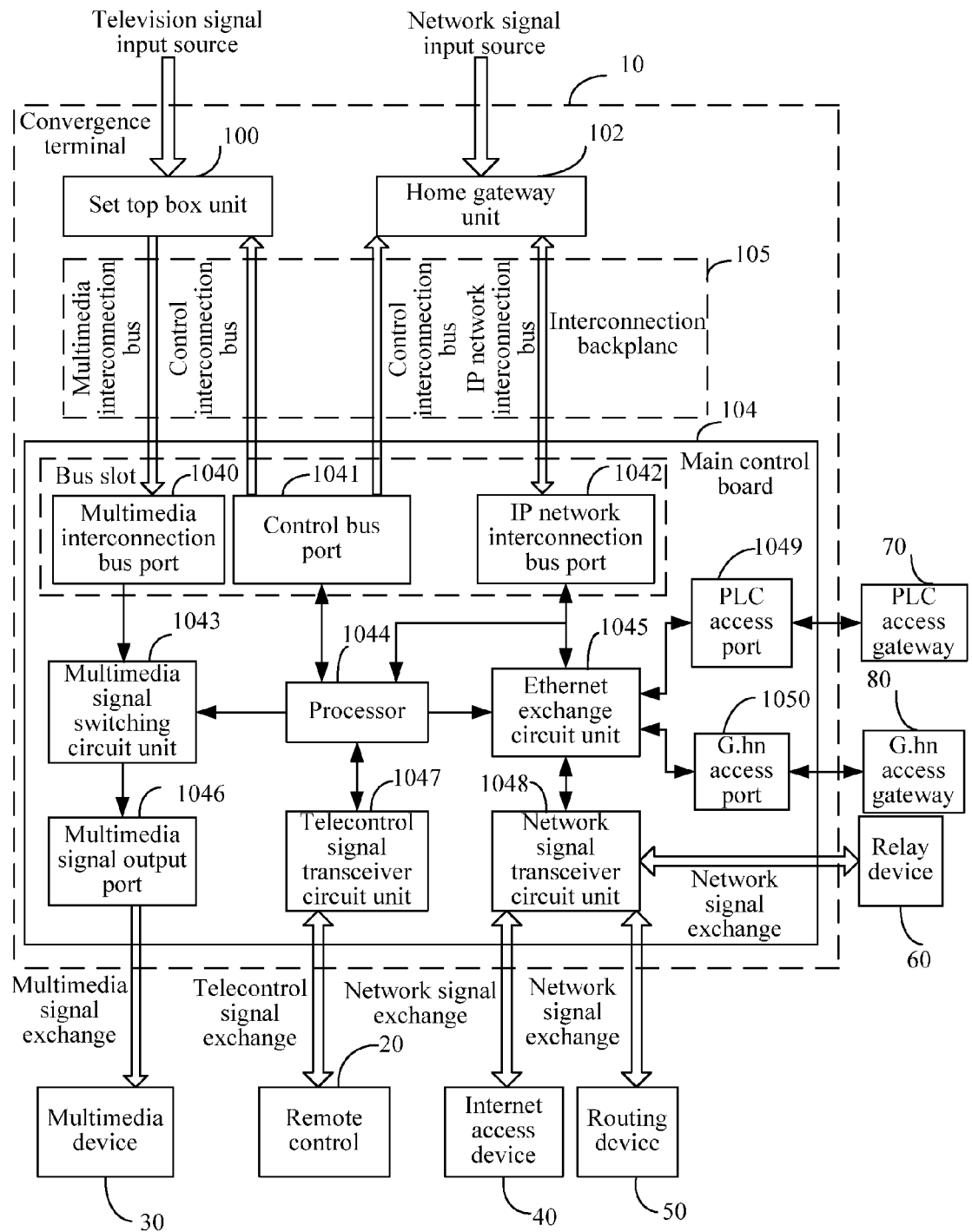
FIG. 5 is an application architecture diagram of the second structure of the main control board of the convergence terminal according to Embodiment 1.

FIG. 5 is an application architecture diagram of the second structure of the main control board of the convergence terminal according to Embodiment 1.

In this embodiment, a difference between FIG. 5 and FIG. 3 lies in that, the Ethernet exchange circuit unit 1045 connects, in a communication manner, to the PLC access gateway 70 through the PLC access port 1049, and the Ethernet exchange circuit unit 1045 connects, in a communication manner, to the G.hn access gateway 80 through the G.hn access port 1050. It may be understood that, the Ethernet exchange circuit unit 1045 in FIG. 3 may provide a communication port through which the Ethernet exchange circuit unit 1045 directly connects to the PLC access gateway 70 or the G.hn access gateway 80, and the Ethernet exchange circuit unit 1045 in FIG. 5 does not provide a communication port through which the Ethernet exchange circuit unit 1045 directly connects to the PLC access gateway 70 or the G.hn access gateway 80, and needs to connect, in a communication manner, to the PLC access gateway 70 or the G.hn access gateway 80 through a built-in port of the main control board 104. Other unit structures in FIG. 5 have the same functions as those of other unit structures with the same names in FIG. 3.

Figure 6:
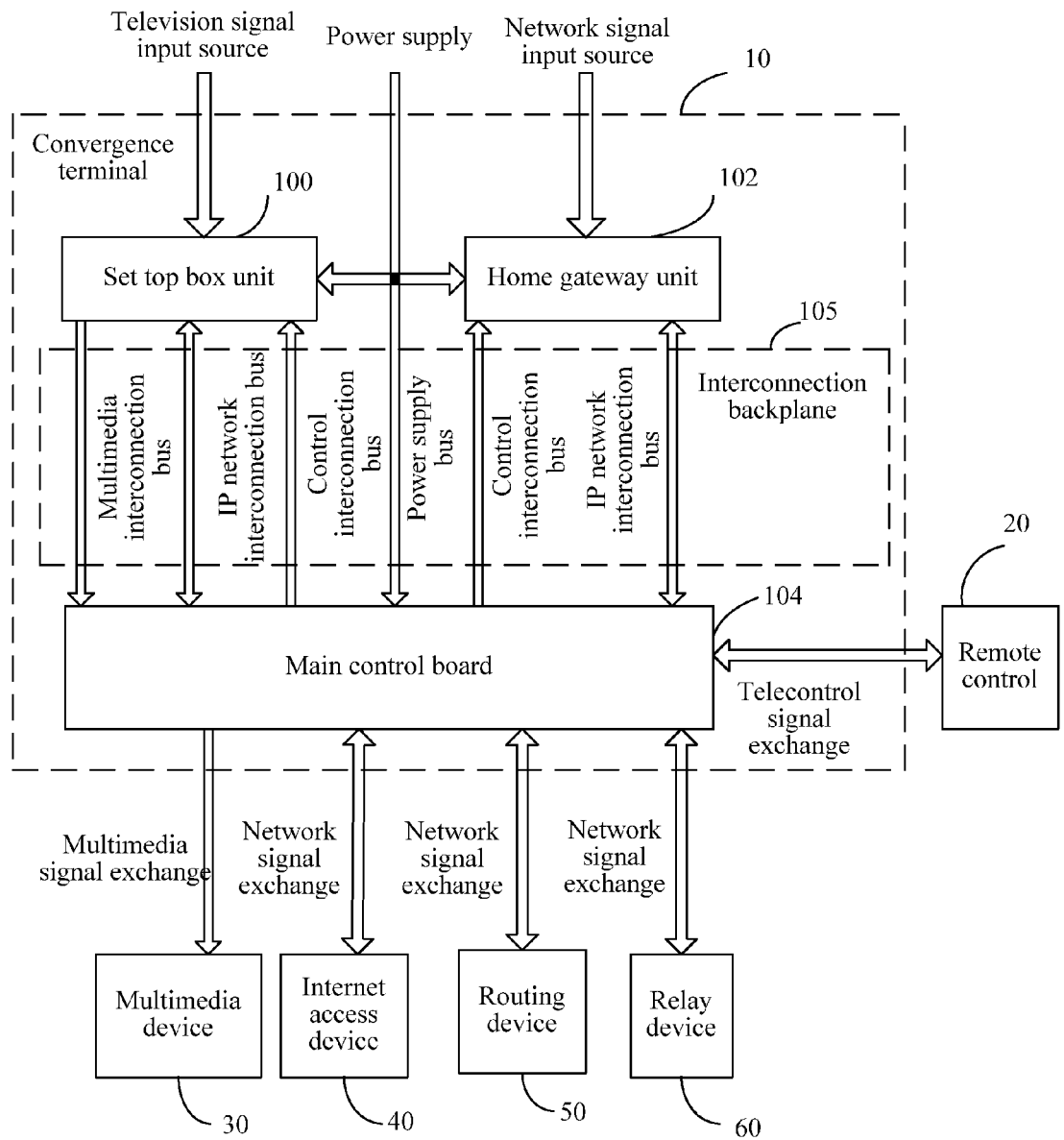
FIG. 6 is a diagram of a second application system architecture of the convergence terminal according to Embodiment 1.

FIG. 6 is a diagram of a second application system architecture of the convergence terminal according to Embodiment 1.

A difference between FIG. 6 and FIG. 1 lies in that, the set top box unit 100 in FIG. 6 may further connect, in a communication manner, to the main control board 104 through the IP network interconnection bus. The main control board 104 further performs, through the IP network interconnection bus, digital right management (DRM) or digital transmission content protection over IP (DTCP-IP) encryption on the data provided by the set top box unit 100, so as to maintain content copyright management. Other unit structures in FIG. 6 have the same functions as those of other unit structures with the same names in FIG. 1.

In this embodiment, the multimedia interconnection bus may be further replaced with the IP network interconnection bus, and the set top box unit 100 may send, through the IP network interconnection bus, the converted television signal to the main control board 104 to perform processing.

Figure 7:
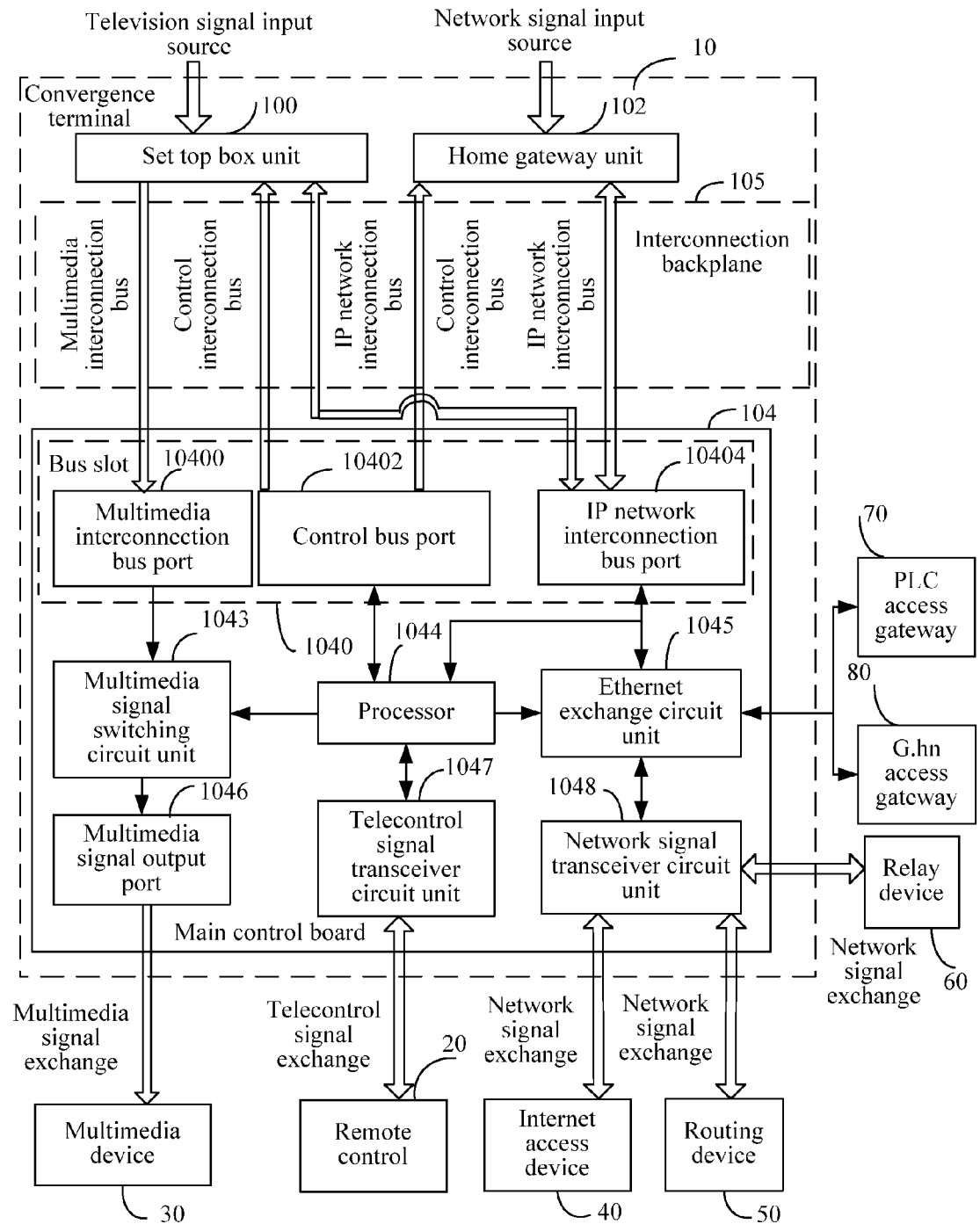
FIG. 7 is an application architecture diagram of a third structure of the main control board of the convergence terminal according to Embodiment 1.

FIG. 7 is an application architecture diagram of a third structure of the main control board of the convergence terminal according to Embodiment 1.

In this embodiment, on the basis of FIG. 6, a difference between FIG. 7 and FIG. 3 lies in that, the set top box unit 100 connects, in a communication manner, to the IP network interconnection bus port 10404 in the main control board 104 through the IP network interconnection bus. Other unit structures in FIG. 7 have the same functions as those of other unit structures with the same names in FIG. 3.

In this embodiment, the processor 1044 in the main control board 104 performs, through the IP network interconnection bus port 10404, DRM or DTCP-IP encryption on the data provided by the set top box unit 100, so as to maintain content copyright management.

Figure 8:
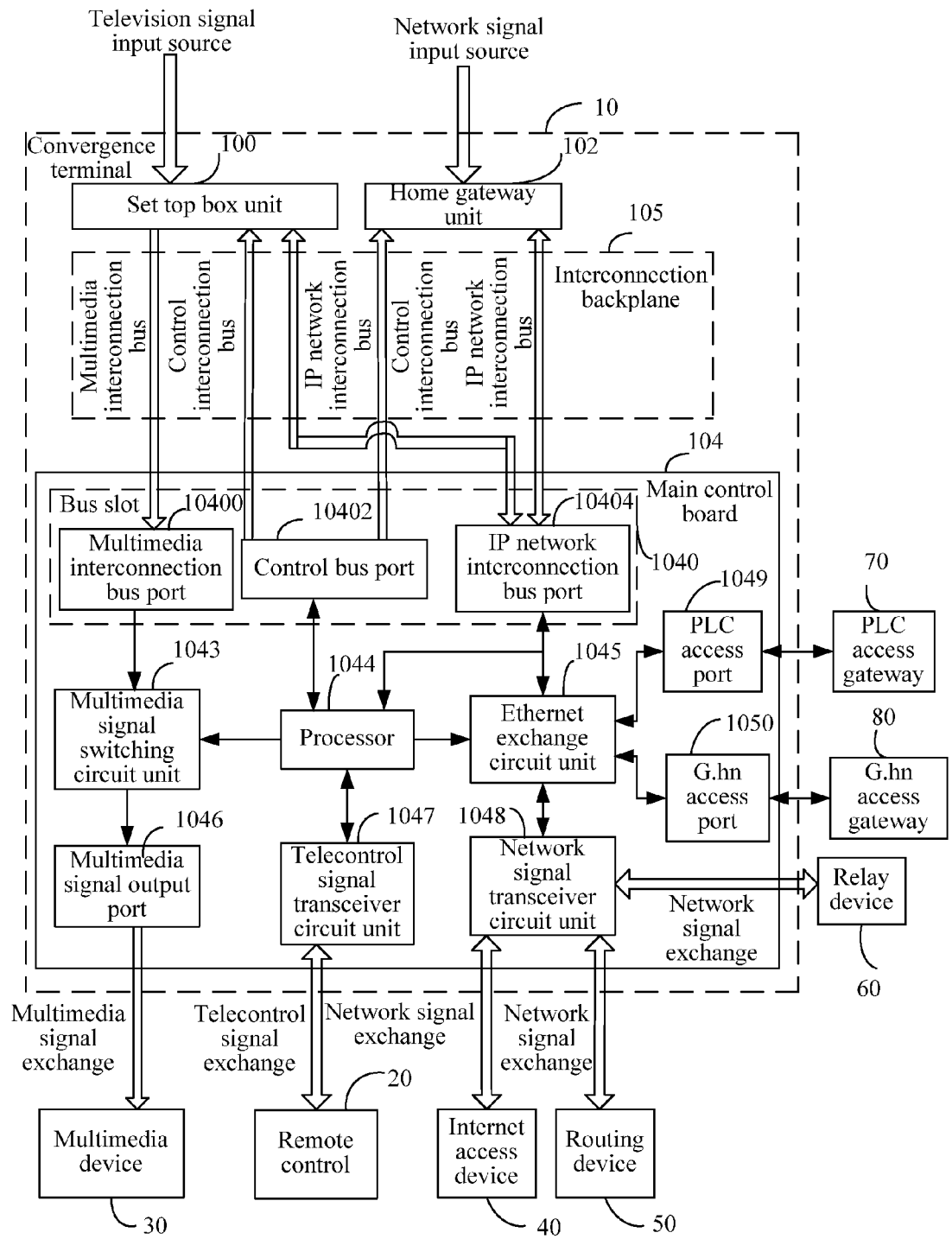
FIG. 8 is an application architecture diagram of a fourth structure of the main control board of the convergence terminal according to Embodiment 1.

FIG. 8 is an application architecture diagram of a fourth structure of the main control board of the convergence terminal according to Embodiment 1.

In this embodiment, on the basis of FIG. 6, a difference between FIG. 8 and FIG. 5 lies in that, the set top box unit 100 connects, in a communication manner, to the IP network interconnection bus port 10404 in the main control board 104 through the IP network interconnection bus. Other unit structures in FIG. 8 have the same functions as those of other unit structures with the same names in FIG. 5.

Figure 9:
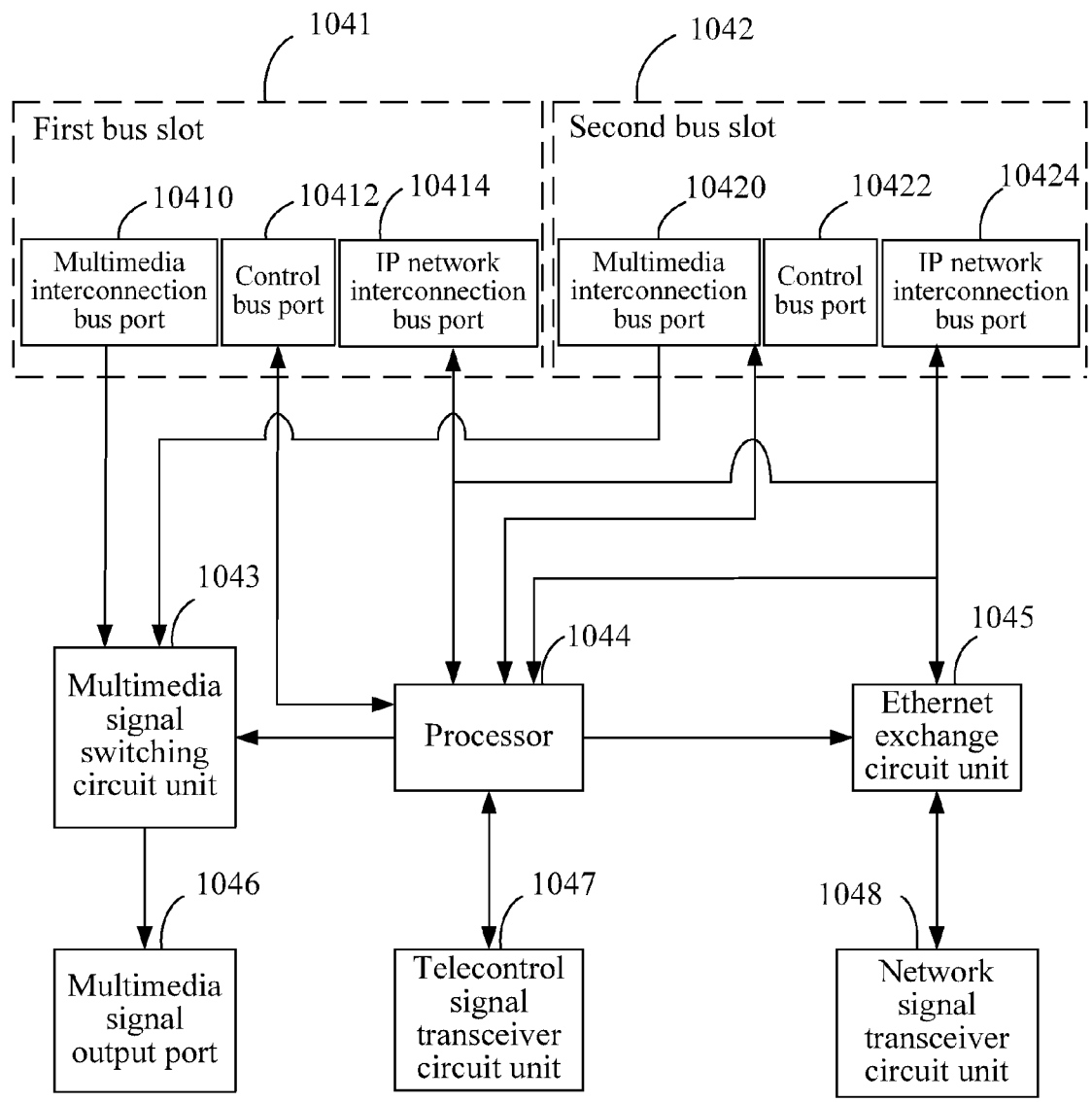
FIG. 9 is a diagram of a fifth structure of a main control board of a convergence terminal according to Embodiment 2.

FIG. 9 is a diagram of a fifth structure of a main control board of a convergence terminal according to Embodiment 2.

In this embodiment, a difference between FIG. 9 and FIG. 2 as well as FIG. 4 lies in that, the main control board 104 includes two bus slots with a same structure, which are a first bus slot 1041 and a second bus slot 1042 respectively, while the main control board 104 in FIG. 2 and FIG. 4 only includes one bus slot; meanwhile, the first bus slot 1041 and the second bus slot 1042 may externally connect to the set top box unit 100 and the home gateway unit 102 respectively, the first bus slot 1041 and the second bus slot 1042 may also externally connect to the set top box unit 100 separately and simultaneously, and the first bus slot 1041 and the second bus slot 1042 may also externally connect to the home gateway unit 102 separately and simultaneously. The first bus slot 1041 and the second bus slot 1042 in FIG. 9 have the same function structure as that of the bus slot 1040 in FIG. 2 and FIG. 4. Other unit structures in FIG. 9 have the same functions as those of other unit structures with the same names in FIG. 2 or FIG. 4.

In this embodiment, the structure shown in FIG. 9 may replace a unit for providing a service according to an actual demand, which may be convenient for a user to freely select a service mode.

Figure 10:
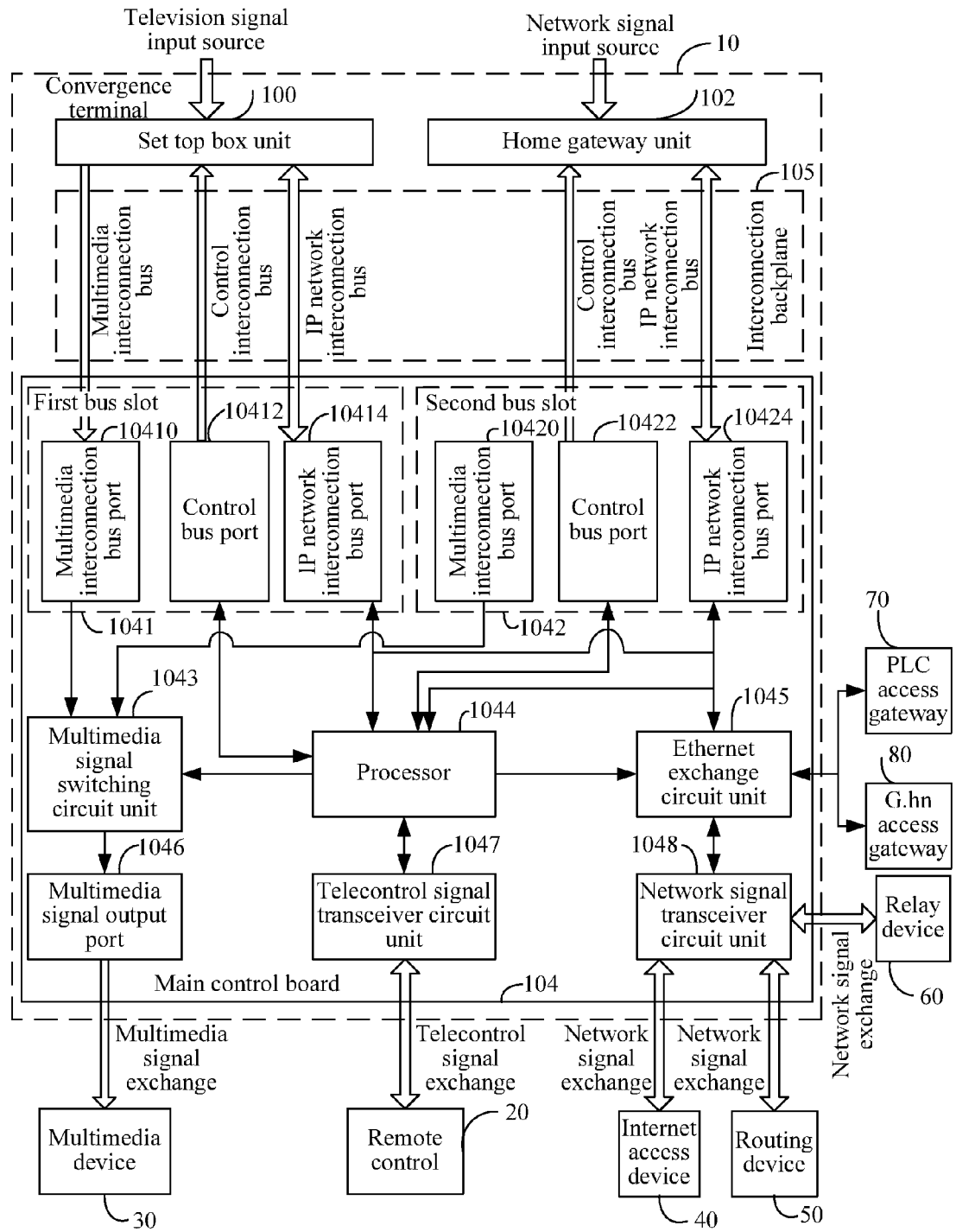
FIG. 10 is a first application architecture diagram of the fifth structure of the main control board of the convergence terminal according to Embodiment 2.

FIG. 10 is a first application architecture diagram of the fifth structure diagram of the main control board of the convergence terminal according to Embodiment 2.

In this embodiment, a difference between FIG. 10 and FIG. 7 lies in that, the main control board 104 includes two bus slots with a same structure, which are a first bus slot 1041 and a second bus slot 1042 respectively, and the first bus slot 1041 and the second bus slot 1042 may externally connect to the set top box unit 100 and the home gateway unit 102 respectively. The first bus slot 1041 connects, in a communication manner, to the set top box unit 100 through the multimedia interconnection bus, the control interconnection bus and the IP network interconnection bus. A multimedia interconnection bus port 10410 in the first bus slot 1041 connects, in a communication manner, to the set top box unit 100 through the multimedia interconnection bus, a control interconnection bus port (or control bus port) 10412 in the first bus slot 1041 connects, in a communication manner, to the set top box unit 100 through the control interconnection bus, and an IP network interconnection bus port 10414 in the first bus slot 1041 connects, in a communication manner, to the set top box unit 100 through the IP network interconnection bus. A multimedia interconnection bus port 10420 in the second bus slot 1042 connects, in a communication manner, to the home gateway unit 102 through the control interconnection bus and the IP network interconnection bus. A control interconnection bus port 10422 in the second bus slot 1042 connects, in a communication manner, to the home gateway unit 102 through the control interconnection bus, and an IP network interconnection bus port 10424 in the second bus slot 1042 connects, in a communication manner, to the home gateway unit 102. Other unit structures in FIG. 10 have the same functions as those of other unit structures with the same names in FIG. 7.

Figure 11:
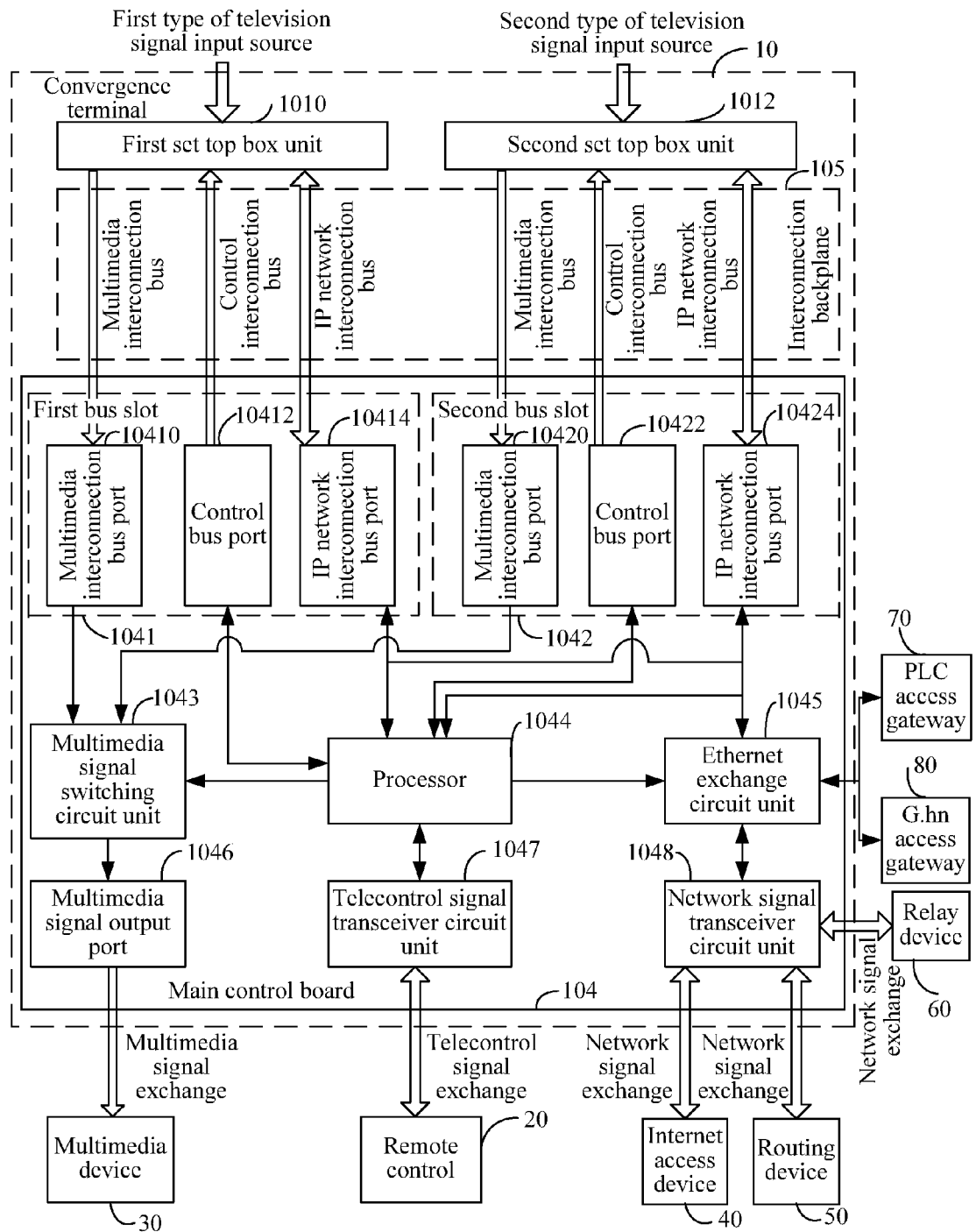
FIG. 11 is a second application architecture diagram of the fifth structure diagram of the main control board of the convergence terminal according to Embodiment 2.

FIG. 11 is a second application architecture diagram of the fifth structure diagram of the main control board of the convergence terminal according to Embodiment 2.

In this embodiment, a difference between FIG. 11 and FIG. 10 lies in that, the first bus slot 1041 and the second bus slot 1042 in FIG. 11 may each externally connect to an external set top box unit simultaneously, namely, the first bus slot 1041 externally connects to a first set top box unit 1010, and the second bus slot 1042 externally connects to a second set top box unit 1012; meanwhile, the first set top box unit 1010 and the second set top box unit 1012 each externally connect to a television signal input source. In this embodiment, the first set top box unit 1010 externally connects to a first type of television signal input source, the second set top box unit 1012 externally connects to a second type of television signal input source, and the first type of television signal input source and the second type of television signal input source are different types of television signal input sources. It may also be understood that, different television providers provide different types of television signal input sources. For example, a television provider A may provide a satellite television signal, and a television provider B may provide a digital television signal. Other unit structures in FIG. 11 have the same functions as those of other unit structures with the same names in FIG. 10. The first set top box unit 1010 may be a digital set top box unit, and the second set top box unit 1012 may be a satellite set top box unit. In this embodiment, the convergence terminal may be a terminal providing television services of different types of television signals.

In this embodiment, when a user starts up and uses the convergence terminal, the main control board in the convergence terminal provides a UI, and outputs the user main control interface to the multimedia device (taking a television set as an example), and names of a plurality of service modules, such as a first set top box and a second set top box, are displayed on the user main control interface. When the user needs to watch television, the user selects a corresponding type of set top box unit according to a type of the television signal input source. For example, if the type of the television signal input source is a digital television signal, the user needs to select a digital set top box; if the type of the television signal input source is a satellite television signal, the user needs to select a satellite set top box. Meanwhile, the user selects the set top box service through the remote control, and in this case, the user sends, through the remote control, the request signal for selecting a set top box service to the main control board 104 in the convergence terminal 10. The request signal may include a type identifier of a set top box, and the type identifier is used to distinguish the first set top box from the second set top box, namely, distinguish the digital set top box from the satellite set top box. The processor 1044 in the main control board 104 may control a corresponding set top box unit based on the request signal which is for selecting a set top box service and is sent by the remote control 20.

In this embodiment, the user may select, according to a type of a current television service provider, a corresponding type of set top box unit to provide a television service, which is convenient for the user to autonomously select, through the convergence terminal, television services provided by different television providers, namely, which is convenient for the user to autonomously select, through the convergence terminal, television services of different types of television signals.

Figure 12:
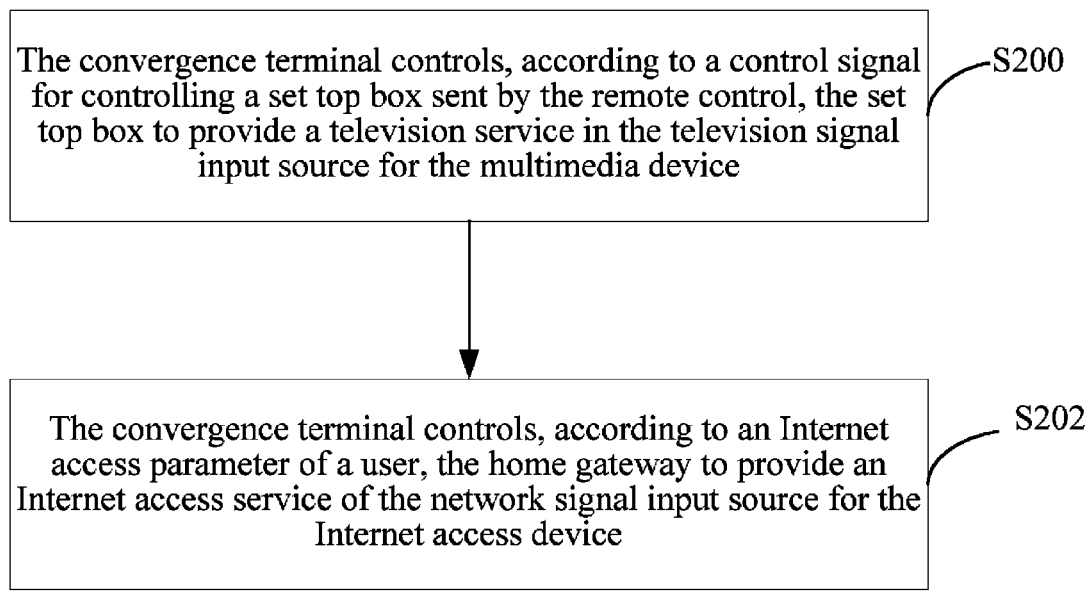
FIG. 12 is a first flow chart of a method for providing multi-service according to an embodiment.

FIG. 12 is a first flow chart of a method for providing multi-service according to an embodiment.

In this embodiment, the method for providing multi-service is applied to implementing that a television service and an Internet access service are separately provided through a service terminal, and the service terminal may be referred to as a convergence terminal. Meanwhile, the convergence terminal may further connect, in a communication manner, to a multimedia device, a remote control, an Internet access device, a routing device, or a relay device, and may externally connect to a television signal input source and a network signal input source, and the convergence terminal provides a television service provided by the television signal input source for the multimedia device, and provides an Internet service of a fixed network provided by the network signal input source for the Internet access device, the routing device, or the relay device (taking the Internet access device as an example in the following).

In a first situation, the convergence terminal also provides an Internet access service for the Internet access device at the same time of providing the television service provided by the television signal input source for the multimedia device.

In this embodiment, the convergence terminal provides the television service provided by the television signal input source for the multimedia device, and the convergence terminal may include a set top box unit, a home gateway unit, a main control board, and an interconnection backplane, as shown in FIG. 12.

Step S200: The convergence terminal controls, according to a control signal for controlling a set top box sent by the remote control, the set top box to provide a television service in the television signal input source for the multimedia device.

Step S202: The convergence terminal controls, according to an Internet access parameter of a user, the home gateway unit to provide an Internet access service of the network signal input source for the Internet access device.

In this embodiment, an execution sequence of step S200 and step S202 is not limited.

Figure 13:
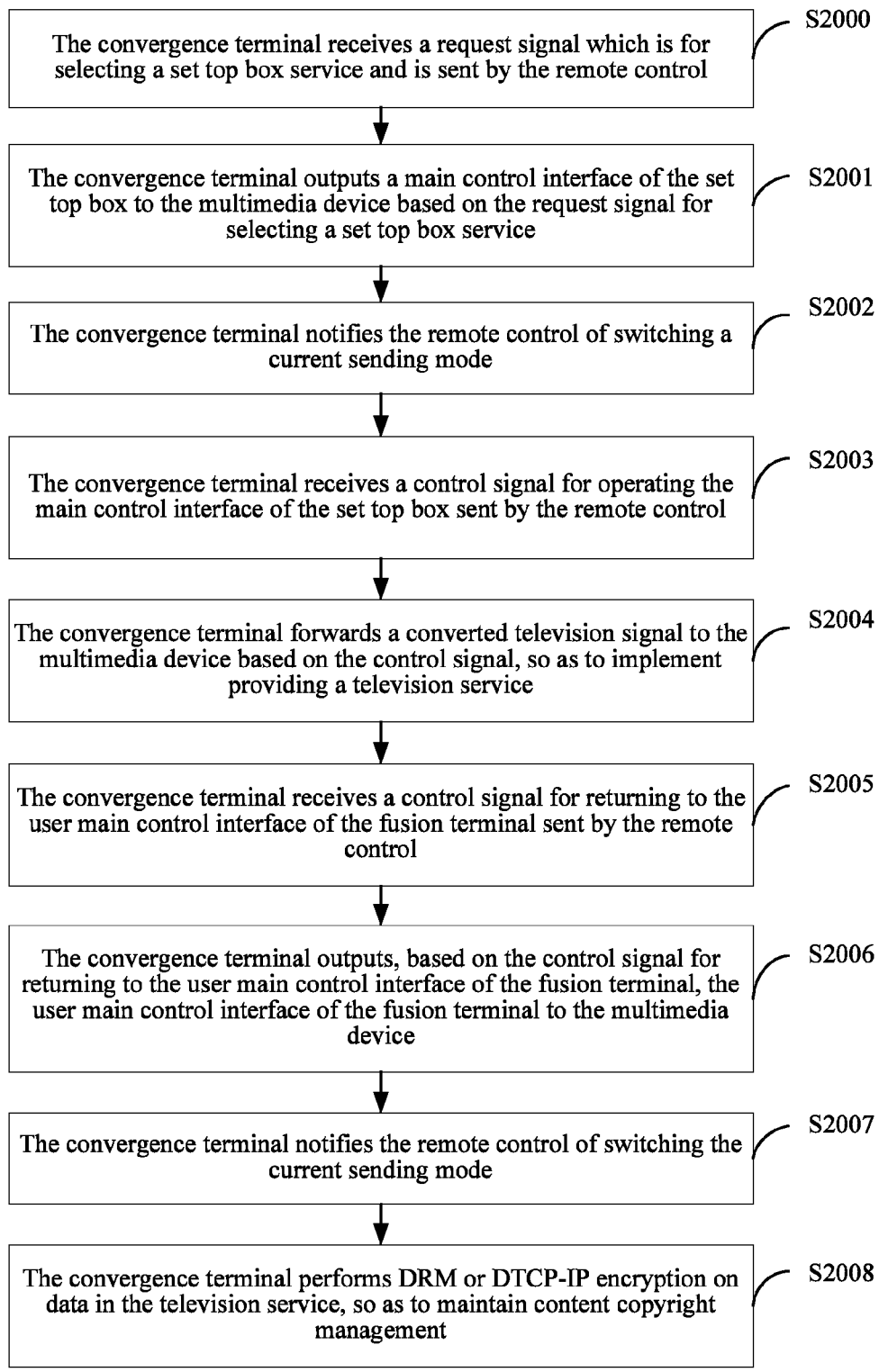
FIG. 13 is a specific flow chart of step S200 of FIG. 12 of the method for providing multi-service according to the embodiment.

FIG. 13 is a specific flow chart of S200 of the method for providing multi-service according to the embodiment.

In this embodiment, step S2000: The convergence terminal receives a request signal which is for selecting a set top box service and is sent by the remote control. The main control board in the convergence terminal receives the request signal which is for selecting a set top box service and is sent by the remote control. In this embodiment, when a user starts up and uses the convergence terminal, the main control board in the convergence terminal provides a UI, and outputs the user main control interface to the multimedia device (taking a television set as an example), and names of a plurality of service modules, such as a set top box and a home gateway, are displayed on the user main control interface. When the user needs to watch television, the user selects the set top box service through the remote control, and in this case, the user sends, through the remote control, the request signal for selecting a set top box service to the main control board in the convergence terminal.

Step S2001: The convergence terminal outputs a main control interface of the set top box to the multimedia device based on the request signal for selecting a set top box service. The main control board in the convergence terminal controls, through a control interconnection bus in the interconnection backplane and based on the request signal for selecting a set top box service, the set top box unit to output the main control interface of the set top box, and receives the main control interface of the set top box through a multimedia interconnection bus in the interconnection backplane; later, the main control board in the convergence terminal outputs the main control interface of the set top box to the multimedia device. It may also be understood that, first output of a multimedia signal of the main control interface of the set top box to the multimedia device is interrupted, and then a multimedia signal of the user main control interface of the convergence terminal is output to the multimedia device. It may also be understood that, the convergence terminal switches a current user main control interface to the main control interface of the set top box.

Step S2002: The convergence terminal notifies the remote control of switching a current sending mode. In this embodiment, when the remote control interacts with the user main control interface in the convergence terminal, the current sending mode of the remote control is a main control sending mode; when the remote control interacts with the main control interface of the set top box, the sending mode of the remote control is an infrared ray sending mode or a Bluetooth sending mode or an RF sending mode of the set top box. Therefore, in this step, the current sending mode of the remote control needs to be switched to a sending mode of the set top box.

Step S2003: The convergence terminal receives a control signal for operating the main control interface of the set top box sent by the remote control. The main control board in the convergence terminal receives the control signal for operating the main control interface of the set top box sent by the remote control. In this embodiment, after the main control board outputs the main control interface of the set top box to the multimedia device, the user may again send, through the remote control, the control signal for operating the main control interface of the set top box. It may be understood that, the control signal is used to operate functions provided in the main control interface of the set top box, such as, channel search, channel switching, volume adjustment, program on demand, and program play.

Step S2004: The convergence terminal forwards a converted television signal to the multimedia device based on the control signal, so as to implement providing a television service.

The main control board in the convergence terminal controls, through the control interconnection bus in the interconnection backplane and based on the control signal, the set top box unit to output the television signal converted by the set top box unit; the main control board in the convergence terminal receives the converted television signal through the multimedia interconnection bus in the interconnection backplane; the main control board in the convergence terminal forwards the converted television signal to the multimedia device, so as to implement providing a television service. In this embodiment, the set top box unit in the convergence terminal needs to convert the television signal provided by the television signal input source, and then the convergence terminal forwards the converted television signal to the multimedia device.

Alternatively, when the user does not need any service provided by the set top box, in step S2005, the convergence terminal receives a control signal for returning to the user main control interface of the convergence terminal sent by the remote control.

Step S2006: The convergence terminal outputs, based on the control signal for returning to the user main control interface of the convergence terminal, the user main control interface of the convergence terminal to the multimedia device. In this embodiment, it may also be understood that, first output of the multimedia signal of the main control interface of the set top box to the multimedia device is interrupted, and then the multimedia signal of the user main control interface of the convergence terminal is output to the multimedia device. It may also be understood that, the convergence terminal switches a main control interface of a current set top box to the user main control interface of the convergence terminal.

The user may operate a Home key, or a main control return key, or other keys which may instruct returning to the user main control interface of the convergence terminal in the remote control. In this case, the remote control forwards a corresponding key code to the convergence terminal, and the convergence terminal sends the UI of the convergence terminal to the multimedia device 30.

Step S2007: The convergence terminal notifies the remote control of switching the current sending mode. The remote control is notified to switch the sending mode of the set top box to the main control sending mode.

Alternatively, the method further includes step S2008: The convergence terminal performs DRM or DTCP-IP encryption on data in the television service, so as to maintain content copyright management.

Figure 15:
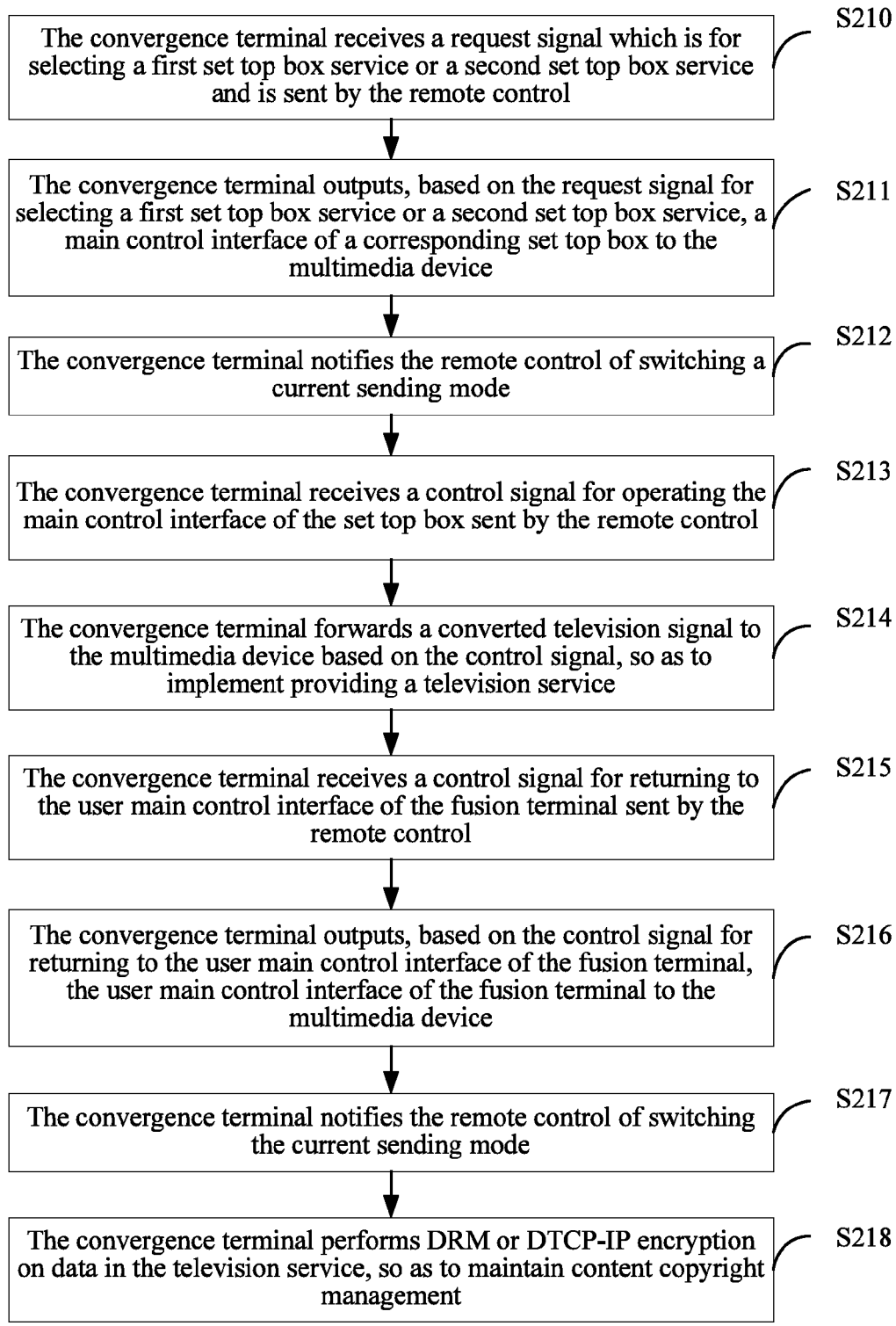
FIG. 15 is a second flow chart of a method for providing multi-service according to an embodiment.

While the foregoing steps are executed, the following steps may be executed simultaneously, namely, while a set top box service is provided, an Internet access service may also be provided simultaneously, as shown in FIG. 15.

Figure 14:
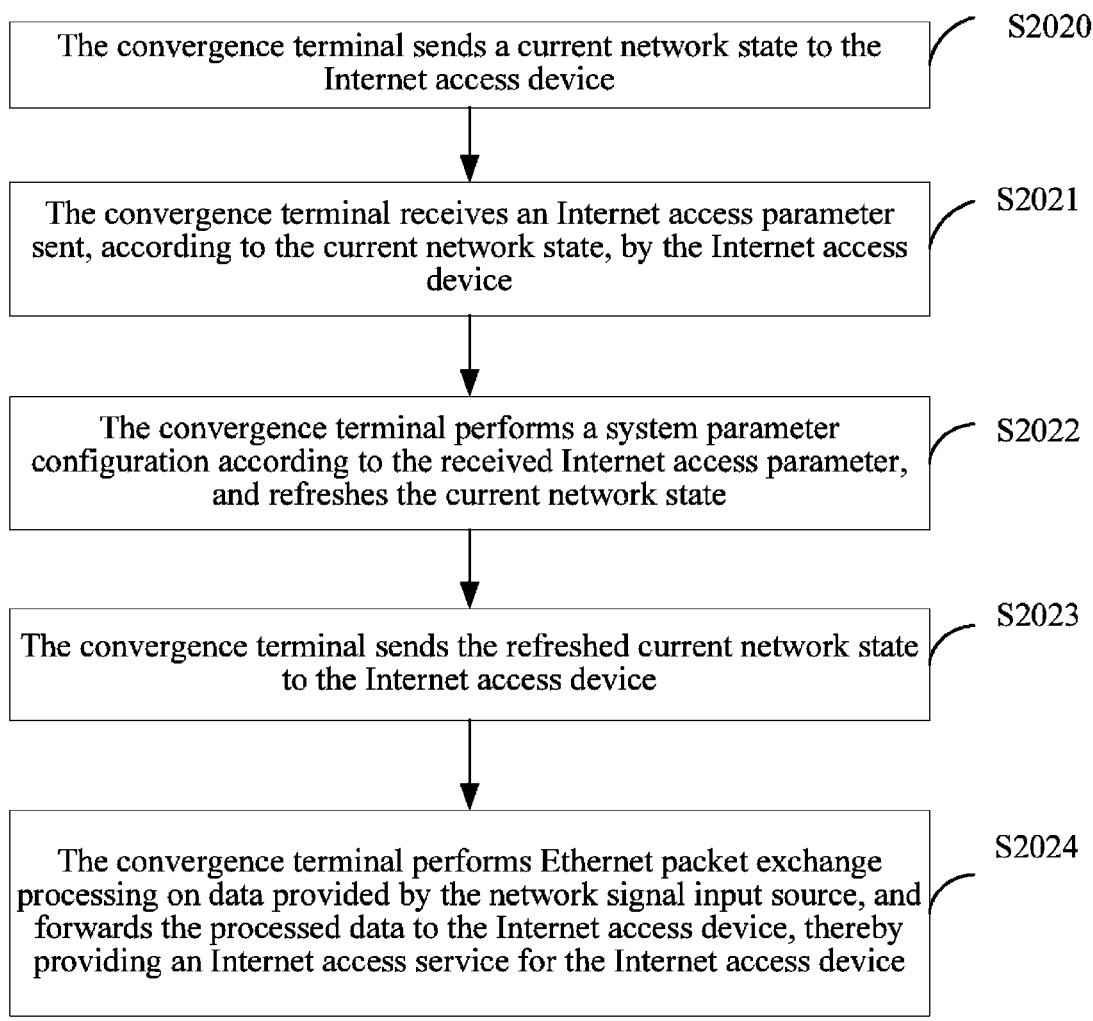
FIG. 14 is a specific flow chart of step S202 of FIG. 12 of the method for providing multi-service according to the embodiment.

FIG. 14 is a specific flow chart of S202 of the method for providing multi-service according to the embodiment.

Step S2020: The convergence terminal sends a current network state to the Internet access device. The main control board of the convergence terminal receives, through an IP network interconnection bus, a current system state and a current system configuration reported by the home gateway unit; the main control board forwards the network state of the home gateway to the Internet access device. The current system state may include a network state, a use state, a hanging death state and the like of the convergence terminal.

Step S2021: The convergence terminal receives an Internet access parameter sent, according to the current network state, by the Internet access device. When the user starts up and uses the convergence terminal, the home gateway unit in the convergence terminal is also powered on and started. In this case, the current network state is a network disconnection state, and if the Internet access device needs to connect to a network, the user needs to set the Internet access parameter at the Internet access device, namely, input an Internet access account and an Internet access password. The main control board of the convergence terminal receives the Internet access parameter sent by the Internet access device.

Step S2022: The convergence terminal performs a system parameter configuration according to the received Internet access parameter, and refreshes the current network state. The main control board delivers the Internet access parameter to the home gateway unit through the IP network interconnection bus; after the home gateway unit is configured successfully according to the Internet access parameter, the main control board receives, through the IP network interconnection bus, a work state after the configuration is successful, and refreshes the current network state of the home gateway. In this case, the refreshed current network state is a network connected state, so the Internet access device may access Internet through the convergence terminal.

Step S2023: The convergence terminal sends the refreshed current network state to the Internet access device. The main control board sends the refreshed current network state to the Internet access device.

Step S2024: The convergence terminal performs Ethernet packet exchange processing on data provided by the network signal input source, and forwards the processed data to the Internet access device, thereby providing an Internet access service for the Internet access device. The main control board performs Ethernet packet exchange processing on IP data provided by the home gateway unit, and forwards the processed data to the Internet access device, thereby implementing an Internet access service. Subsequently, the Internet access device may also forward the data to the home gateway unit through the main control board.

Alternatively, when a work state of a current Internet access service of the convergence terminal is the hanging death state (namely, the current system state of the home gateway is the hanging death state), a reset operation may be performed on the convergence terminal, so as to restart the Internet access service of the convergence terminal. The main control board may perform reset operation control on the home gateway unit through the control interconnection bus.

In this embodiment, alternatively, the method further includes that the convergence terminal provides the Internet access device with an Internet access service provided by a PLC access gateway or a G.hn access gateway. The main control board of the convergence terminal performs Ethernet packet exchange processing on IP data provided by the PLC access gateway or the G.hn access gateway, and forwards the processed data to the Internet access device, thereby implementing an Internet access service.

Through the method for providing multi-service provided by this embodiment, the convergence terminal provides a television service and an Internet access service simultaneously, thereby reducing the number of service terminals used by a user for enjoying different services, and also reducing frequent wiring operations of the user on connection wires for inward connection and outward connection.

FIG. 15 is a second flow chart of a method for providing multi-service according to an embodiment.

In a second situation, alternatively, the convergence terminal may provide television services of different types of television signals for the multimedia device according to different types of television signal input sources. Namely, in this embodiment, the convergence terminal may include a first set top box unit, a second set top box unit, a main control board, and an interconnection backplane. The two set top box units are a digital set top box unit and a satellite set top box unit respectively, the first set top box unit externally connects to a first type of television signal input source, the second set top box unit externally connects to a second type of television signal input source, and the first type of television signal input source and the second type of television signal input source are different types of television signal input sources.

In this embodiment, the convergence terminal controls, according to a control signal for controlling the first set top box unit or the second set top box unit sent by the remote control, the first set top box unit or the second set top box unit to provide a television service in a television signal input source of a corresponding type for the multimedia device.

Step S210: The convergence terminal receives a request signal which is for selecting a first set top box service or a second set top box service and is sent by the remote control. The main control board in the convergence terminal receives the request signal which is for selecting a first set top box service or a second set top box service and is sent by the remote control. In this embodiment, when a user starts up and uses the convergence terminal, the main control board in the convergence terminal provides a UI, and outputs the user main control interface to the multimedia device (taking a television set as an example), and names of a plurality of service modules, such as a first set top box unit and a second set top box unit, are displayed on the user main control interface. When the user needs to watch television, the user selects a corresponding type of set top box unit according to a type of the television signal input source. For example, if the type of the television signal input source is a digital television signal, the user needs to select a digital set top box; if the type of the television signal input source is a satellite television signal, the user needs to select a satellite set top box. Meanwhile, the user selects a set top box service of a corresponding type through the remote control, and in this case, the user sends, through the remote control, the request signal for selecting a set top box service to the main control board in the convergence terminal. The request signal may include a type identifier of a set top box, and the type identifier is used to distinguish the first set top box from the second set top box, namely, distinguish the digital set top box from the satellite set top box.

Step S211: The convergence terminal outputs, based on the request signal for selecting a first set top box service or a second set top box service, a main control interface of a corresponding set top box to the multimedia device. The main control board of the convergence terminal chooses to control a corresponding set top box unit according to a set top box identifier in the request signal. The main control board in the convergence terminal controls, through a control interconnection bus in the interconnection backplane and based on the request signal for selecting a set top box service, the set top box unit to output the main control interface of the set top box, and receives the main control interface of the set top box through a multimedia interconnection bus in the interconnection backplane; later, the main control board in the convergence terminal outputs the main control interface of the set top box to the multimedia device. It may also be understood that, the convergence terminal switches a current user main control interface to the main control interface of the set top box.

Step S212: The convergence terminal notifies the remote control of switching a current sending mode. In this embodiment, when the remote control interacts with the user main control interface in the convergence terminal, the current sending mode of the remote control is a main control sending mode; when the remote control interacts with the main control interface of the set top box, the sending mode of the remote control is an infrared ray sending mode or a Bluetooth sending mode or an RF sending mode of the set top box. Therefore, in this step, the current sending mode of the remote control needs to be switched to a sending mode of the set top box.

Step S213: The convergence terminal receives a control signal for operating the main control interface of the set top box sent by the remote control. The main control board in the convergence terminal receives the control signal for operating the main control interface of the set top box sent by the remote control. In this embodiment, after the main control board outputs the main control interface of the set top box to the multimedia device, the user may again send, through the remote control, the control signal for operating the main control interface of the set top box. It may be understood that, the control signal is used to operate functions provided in the main control interface of the set top box, such as, channel search, channel switching, volume adjustment, program on demand, and program play.

Step S214: The convergence terminal forwards a converted television signal to the multimedia device based on the control signal, so as to implement providing a television service.

The main control board in the convergence terminal controls, through the control interconnection bus in the interconnection backplane and based on the control signal, the set top box unit to output the television signal converted by the set top box unit; the main control board in the convergence terminal receives the converted television signal through the multimedia interconnection bus in the interconnection backplane; the main control board in the convergence terminal forwards the converted television signal to the multimedia device, so as to implement providing a television service. In this embodiment, the set top box unit in the convergence terminal needs to convert a television signal provided by the television signal input source, and then the convergence terminal forwards the converted television signal to the multimedia device.

Alternatively, when the user does not need any service provided by the set top box, in step S215, the convergence terminal receives a control signal for returning to the user main control interface of the convergence terminal sent by the remote control.

Step S216: The convergence terminal outputs, based on the control signal for returning to the user main control interface of the convergence terminal, the user main control interface of the convergence terminal to the multimedia device. In this embodiment, it may also be understood that, the convergence terminal switches a main control interface of a current set top box to the user main control interface of the convergence terminal.

The user may operate a Home key, or a main control return key, or other keys which may instruct returning to the user main control interface of the convergence terminal in the remote control. In this case, the remote control forwards a corresponding key code to the convergence terminal, and the convergence terminal sends the UI of the convergence terminal to the multimedia device 30.

Step S217: The convergence terminal notifies the remote control of switching the current sending mode. The remote control is notified to switch the sending mode of the set top box to the main control sending mode.

Alternatively, the method further includes step S218: The convergence terminal performs DRM or DTCP-IP encryption on data in the television service, so as to maintain content copyright management.

In this embodiment, the user may select, according to a type of a current television service provider, a corresponding type of set top box unit to provide a television service, which is convenient for the user to autonomously select, through the convergence terminal, television services provided by different television providers, namely, which is convenient for the user to autonomously select, through the convergence terminal, television services of different types of television signals.

Sequence numbers of the foregoing embodiments of the present invention are merely for the convenience of description, and do not imply the preference among the embodiments.

Persons skilled in the art may clearly understand that the embodiments of the present invention may be implemented in a manner of software plus a necessary general hardware platform. Based on such understanding, the foregoing technical solutions of the embodiments of the present invention or the part that makes contributions to the prior art may be substantially embodied in a form of a software product. The computer software product may be stored in a storage medium such as an read-only memory (ROM), a random access memory (RAM), a magnetic disk, or an optical disk, and includes several instructions to instruct a computer device (which may be a personal computer, a server, or a network device, or the like) to perform the methods described in the embodiments of the present invention or in some parts of the embodiments of the present invention.

The foregoing embodiments are not intended to limit the present invention. For persons of ordinary skill in the art, any modification, equivalent replacement, and improvement made without departing from the principle of the present invention shall fall within the protection scope of the present invention.

What is claimed is:

1. A convergence terminal, comprising:
    a set top box coupled to a television signal input source that provides a television service;
    a home gateway coupled to a network signal input source that provides an Internet access service;
    a main control board configured to control the set top box and the home gateway; and
    an interconnection backplane connecting the set top box, the home gateway and the main control board, wherein the interconnection backplane includes a control interconnection bus, a multimedia interconnection bus and an internet protocol (IP) network interconnection bus, wherein the control board controls the set top box via the control interconnection bus and the multimedia interconnection bus, wherein the control board controls the home gateway via he control interconnection bus and the IP network interconnection bus, wherein the main control board comprises a bus slot, a multimedia signal switching circuit, a multimedia signal output port, a processor, a remote control signal transceiver circuit, an Ethernet exchange circuit, and a network signal transceiver circuit, wherein the bus slot comprises a multimedia interconnection bus port, a control interconnection bus port, and an IP network interconnection bus port, wherein the processor is configured to:
control, via the control bus port and the control interconnection bus, the set top box to output a main control interface of the set top box in response to a request signal for selecting a set top box service from the remote control signal transceiver circuit;
control the multimedia signal switching circuit to send the main control interface, via the multimedia interconnection bus and the multimedia interconnection bus port, to the multimedia signal output port; and
configure the home gateway via the IP network interconnection bus and the control bus port in response to an Internet access service request transmitted by the network signal transceiver circuit and the Ethernet exchange circuit in sequence, and wherein the Ethernet exchange circuit is configured to:
perform Ethernet packet exchange on IP data sent from the home gateway via the IP network interconnection bus and the IP network interconnection bus port;
forward the exchanged IP data from the home gateway to the network signal transceiver circuit;
perform Ethernet packet exchange on IP data received from the network signal transceiver circuit;
forward the exchanged IP data received from the network signal transceiver circuit to the home gateway via the IP network interconnection bus port and the IP network interconnection bus;
perform Ethernet packet exchange on IP data sent from a Power Line Connection (PLC) access gateway;
forward the exchanged IP data sent from the PLC access gateway to the network signal transceiver circuit;
perform Ethernet packet exchange on IP data sent from the network signal transceiver circuit; and
forward the exchanged IP data sent from the network signal transceiver circuit to the PLC access gateway.

2. The convergence terminal according to claim 1, wherein the processor is further configured to:
control, through the control bus port and the control interconnection bus, the set top box to output a television signal of the television service in response to a request signal for providing a television service from the remote control signal transceiver circuit; and
control the multimedia signal switching circuit to transmit the television signal sent from the set top box via the multimedia interconnection bus port and the multimedia interconnection bus to the multimedia signal output port.

3. The convergence terminal according to claim 1, wherein the processor is further configured to control the multimedia signal switching circuit to switch a current multimedia signal input of the multimedia interconnection bus port to the multimedia signal input of the processor when receiving, through the remote control signal transceiver circuit, a control signal for returning to the user main control interface.

4. The convergence terminal according to claim 1, wherein the set top box further connects, in a communication manner, to the IP network interconnection bus port through the IP network interconnection bus in the interconnection backplane, and wherein the main control board processor is further configured to encrypt data provided by the set top box via the IP network interconnection bus port and the IP network interconnection bus port, so as to maintain content copyright management.

5. The convergence terminal according to claim 1, wherein the main control board further comprises a PLC access port, wherein the Ethernet exchange circuit is configured to communicate with the PLC access gateway through the PLC access port.

6. A convergence terminal, comprising:
a set top box coupled to a television signal input source that provides television service;
a home gateway coupled to a network signal input source that provides an Internet access service;
a main control board configured to control the set top box and the home gateway; and
an interconnection backplane connecting the set top box, the home gateway and the main control board,
wherein the interconnection backplane includes a control interconnection bus, a multimedia interconnection bus and an internet protocol (IP) network interconnection bus,
wherein the control board controls the set top box via the control interconnection bus and the multimedia interconnection bus,
wherein the control board controls the home gateway via the control interconnection bus and the IP network interconnection bus,
wherein the main control board comprises a bus slot, a multimedia signal switching circuit, multimedia signal output port, a processor, a remote control signal transceiver circuit, an Ethernet exchange circuit and a network signal transceiver,
wherein the bus slot comprises a multimedia interconnection bus port, a control interconnection bus port and an IP network interconnection bus port, and
wherein the processor is configured to:
control via the control bus port and the control interconnection bus, the set top box to output a main control interface of the set top box in response to a request signal for selecting a set top box service from the remote control signal transceiver circuit;
control the multimedia signal switching circuit to send the main control interface, via the multimedia interconnection bus and the multimedia interconnection bus port, to the multimedia signal output port; and
configure the home gateway via the IP network interconnection bus and the control bus port in response to an Internet access service request transmitted by the network signal transceiver circuit and the Ethernet exchange circuit in sequence, and wherein the Ethernet exchange circuit is configured to:

perform Ethernet packet exchange on IP data sent from the home gateway via the IP network interconnection bus and the IP network interconnection bus port;

forward the exchanged IP data from the home gateway to the network signal transceiver circuit;

perform Ethernet packet exchange on IP data received from the network signal transceiver circuit;

forward the exchanged IP data received from the network signal transceiver circuit to the home gateway via the IP network interconnection bus port and the IP network interconnection bus;

perform Ethernet packet processing on an IP data packet sent from a G.hn access gateway;

forward the exchanged IP data sent from the G.hn access gateway to the network signal transceiver circuit;

perform Ethernet packet processing on an IP data packet sent from the network signal transceiver circuit; and forward the exchanged IP data sent from the network signal transceiver circuit to the G.hn access gateway.

7. The convergence terminal according to claim 6, wherein the main control board further comprises a G.hn access port, and therein the Ethernet exchange circuit is configured to communicate with the G.hn access gateway through the G.hn access port.

* * * * *

UNITED STATES PATENT AND TRADEMARK OFFICE
CERTIFICATE OF CORRECTION

PATENT NO. : 9,538,230 B2
APPLICATION NO. : 14/585996
DATED : January 3, 2017
INVENTOR(S) : Zhiqin He et al.

It is certified that error appears in the above-identified patent and that said Letters Patent is hereby corrected as shown below:

In the Claims

Column 27, Line 9, Claim 1 should read:

"wherein the control board controls the home gateway via the control interconnection bus and the IP network interconnection bus,"

Signed and Sealed this
Eleventh Day of April, 2017

Michelle K. Lee
*Director of the United States Patent and Trademark Office*